(12) United States Patent
Ozawa et al.

(10) Patent No.: US 9,723,177 B2
(45) Date of Patent: Aug. 1, 2017

(54) IMAGE PROCESSING SYSTEM, IMAGE PROCESSING APPARATUS, AND IMAGE FORMING APPARATUS

(71) Applicant: KONICA MINOLTA, INC., Chiyoda-ku, Tokyo (JP)

(72) Inventors: Kaitaku Ozawa, Nishinomiya (JP); Katsuhiko Akita, Amagasaki (JP); Hiroaki Kubo, Muko (JP); Kazusei Takahashi, Nishinomiya (JP); Akihiro Torigoshi, Itami (JP); Yuji Okamoto, Nishinomiya (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/045,900

(22) Filed: Feb. 17, 2016

(65) Prior Publication Data

US 2016/0241743 A1 Aug. 18, 2016

(30) Foreign Application Priority Data

Feb. 17, 2015 (JP) .................................. 2015-028347

(51) Int. Cl.
| | | |
|---|---|---|
| *H04N 1/00* | (2006.01) | |
| *H04N 1/46* | (2006.01) | |
| *G06K 9/18* | (2006.01) | |

(52) U.S. Cl.
CPC .............. *H04N 1/465* (2013.01); *G06K 9/183* (2013.01); *H04N 1/46* (2013.01)

(58) Field of Classification Search
None
See application file for complete search history.

(56) References Cited

U.S. PATENT DOCUMENTS

| | | | |
|---|---|---|---|
| 2006/0274390 A1 | 12/2006 | Otake | |
| 2013/0308166 A1* | 11/2013 | Uchidate | ............ H04N 1/00864 |
| | | | 358/3.28 |
| 2014/0029026 A1* | 1/2014 | Saida | ..................... G06K 15/40 |
| | | | 358/1.9 |

FOREIGN PATENT DOCUMENTS

| | | |
|---|---|---|
| JP | 2006345049 A | 12/2006 |
| JP | 2012054663 A | 3/2012 |

(Continued)

OTHER PUBLICATIONS

Japanese Notification of Reasons for Refusal corresponding to Application No. JP2015-028347, with partial English translation; Mailing date of Mar. 21, 2017.

*Primary Examiner* — Marivelisse Santiago Cordero
*Assistant Examiner* — Neil R McLean
(74) *Attorney, Agent, or Firm* — Cantor Colburn LLP

(57) ABSTRACT

An image processing system for generating a processed image depending on an input image is provided. The system includes an image processing portion configured to add, to the processed image, an AR marker which is an image for identifying missing information missing from information of the input image; an AR content generating portion configured to generate an AR content corresponding to the missing information; an AR marker recognizing portion configured to recognize the AR marker contained in a photographed image obtained by photographing the processed image; and an AR display processing portion configured to display the AR content stored in association with the recognized AR marker in a manner to be superimposed on the processed image.

16 Claims, 26 Drawing Sheets

(56) References Cited

FOREIGN PATENT DOCUMENTS

| JP | 2012215989 A | 11/2012 |
|---|---|---|
| JP | 2014024193 A | 2/2014 |

* cited by examiner

FIG. 10

| AR MARKER | AR CONTENT | | | |
|---|---|---|---|---|
| | IMAGE DATA (MISSING IMAGE) | POSITION DATA | SIZE DATA | USER/DEVICE |
| 61 | 411 415 | (x1, y1) | 1:3 | USER A/DEVICE A |

DB1
410

IMAGE PROCESSING SYSTEM, IMAGE PROCESSING APPARATUS, AND IMAGE FORMING APPARATUS

This application is based on Japanese patent application No. 2015-028347 filed on Feb. 17, 2015, the contents of which are hereby incorporated by reference.

BACKGROUND OF THE INVENTION

1. Field of the Invention

The present invention relates to a technique for generating a processed image depending on an input image.

2. Description of the Related Art

An image forming apparatus such as a printer, a copier, or a multi-function device forms a processed image depending on an input image on a sheet. To be specific, such an image forming apparatus executes a print job given thereto to form an image onto a sheet. The input image is inputted in the form of image data from a host requesting the image forming apparatus to carry out printing. Alternatively, the input image is given to the image forming apparatus in the form of being recorded on a document sheet.

When a print job is executed, information of an input image is partly missing in a printed processed image, i.e., a print image. Such information is missing typically in the case where an image forming apparatus is a monochrome image forming apparatus and an input image is a color image. In such a case, color information of the input image is missing.

There has been proposed a conventional technique for reproducing missing information. According to such a conventional technique, in monochrome facsimile transmission, a processed image to be sent is given a two-dimensional barcode where color information, which is expected to be missing, is expanded to the processed image. At a receiving end, the processed image received is converted into a color image based on the two-dimensional barcode given to the processed image. The resultant is then printed (Japanese Laid-open Patent Publication No. 2006-345049).

There has been proposed a conventional technique for preventing color information from missing. According to such a conventional technique, when an image having a color code symbol is printed in monochrome, an image and a monochrome code symbol having code information represented by a color code symbol are synthesized. The resultant synthesized image is then printed (Japanese Laid-open Patent Publication No. 2014-024193).

In the meantime, a variety of services using Augmented Reality (AR) technology has recently been provided. According to the AR technology, when a printed matter having an AR marker thereon is photographed by, for example, a smartphone, a content corresponding to the AR marker is displayed on an image of the photographed printed matter. This enables a user to feel as if the actual space were augmented. Effects similar thereto can be observed by using wearable computers (glasses-type).

According to the conventional technique described in Japanese Laid-open Patent Publication No. 2006-345049, information expected to be missing is represented by an added image such as a two-dimensional barcode. Therefore, an amount of information reproducible is limited to a predetermined value of, at most, approximately 3000 bytes. To be specific, when an amount of missing information is small, all of the missing information can be reproduced. Unfortunately, however, when an amount of missing information is greater than the predetermined value, only a part of the missing information can be reproduced.

The case where an amount of missing information is small includes, for example, a case where an input image is a text image and all the characters are depicted in a color other than black, e.g., in red. In such a case, information indicating that a character color is "red" is represented in the form of a two-dimensional barcode. Thereby, based on a processed image to which a two-dimensional barcode is added and is printed in black, a text image having red characters can be printed or displayed. In a case where some character strings of a text image are red, and the others are blue, information indicating that the m-th line through the n-th line are red and the x-th line is blue can be represented in the form of a two-dimensional barcode. This enables the original text image to be reproduced.

In contrast, the case where an amount of missing information is large includes, for example, a case where an input image has a full-color picture. In such a case, the full-color picture has a large amount of color information represented by a product of the number of pixels and a color of each pixel. Therefore, even if the two-dimensional barcode or any other additional images are used, it is impossible to represent the entirety of the missing information. Thus, only a part of the missing information can be reproduced.

SUMMARY

The present invention has been achieved in light of such an issue, and an object thereof is to improve, as compared to conventional techniques, the reproducibility of information missing when a processed image corresponding to an input image is generated.

A system according to one aspect of the present invention is an image processing system for generating a processed image depending on an input image. The system includes an image processing portion configured to add, to the processed image, an AR marker which is an image for identifying missing information missing from information of the input image when the processed image is generated; an AR content generating portion configured to generate an AR content corresponding to the missing information; an AR content registration portion configured to store, into a storage portion, the AR marker and the AR content in association with each other; a camera for photographing the processed image which is printed or displayed; an AR marker recognizing portion configured to recognize the AR marker contained in a photographed image obtained by photographing the processed image by the camera; and an AR display processing portion configured to display the AR content stored in association with the recognized AR marker in the storage portion in a manner to be superimposed on the processed image photographed by the camera.

These and other characteristics and objects of the present invention will become more apparent by the following descriptions of preferred embodiments with reference to drawings.

BRIEF DESCRIPTION OF THE DRAWINGS

FIG. 10 is a diagram showing an example of an AR database.

DESCRIPTION OF THE PREFERRED EMBODIMENTS

Figure 1:
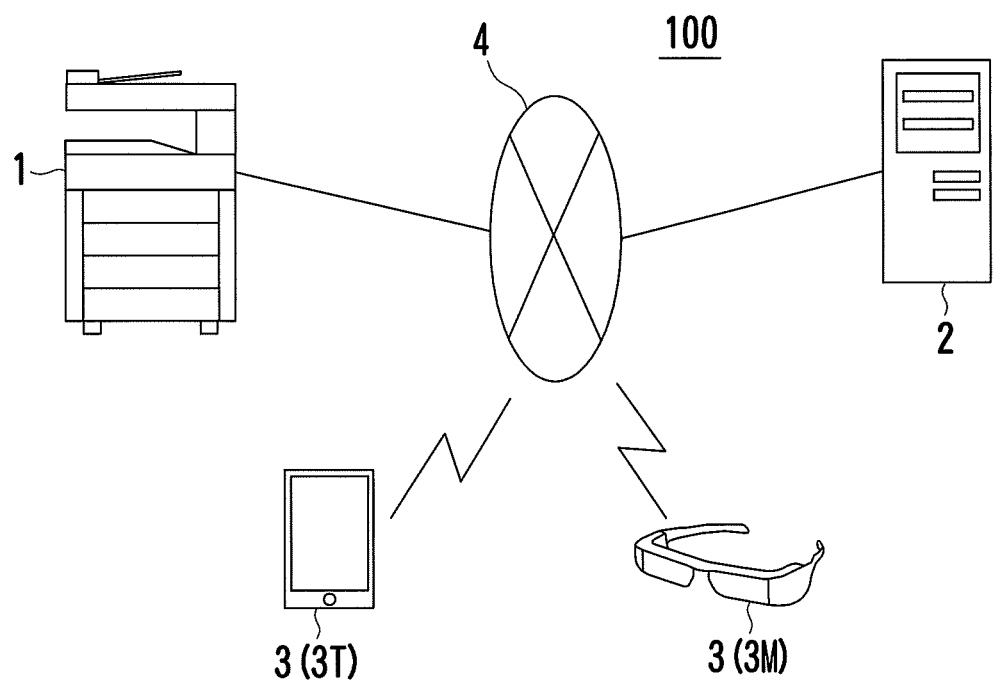
FIG. 1 is a diagram showing an example of the overall configuration of an image processing system according to an embodiment of the present invention.

FIG. 1 shows an example of the overall configuration of an image processing system 100 according to an embodiment of the present invention.

Functions of the image processing system 100 are realized by an image processing apparatus 1 capable of reading and printing an image, an AR server 2 providing an AR content, at least one terminal 3 receiving the AR content, a communication line 4, and so on.

The image processing apparatus 1, the AR server 2, and the terminal 3 are configured to perform communication with one another via the communication line 4. Examples of the communication line 4 include the Internet, a wired Local Area Network (LAN), a wireless LAN network, a public line, a mobile phone network, and a dedicated line. The communication line 4 may have a hub, a router, and a wireless base station.

The image processing apparatus 1 is a multifunction device (Multi-Functional Peripheral: MFP) into which functions of a copier, printer, facsimile machine, scanner, and so on are incorporated. The image processing apparatus 1 is usable as an image forming apparatus for printing an image onto a sheet, and as an image reader for reading a document image from a sheet. In short, the image processing apparatus 1 is an example of the "image processing apparatus" and "image forming apparatus" recited in the present invention.

The terminal 3 displays the AR content provided by the AR server 2. Examples of the terminal 3 include a personal computer, a tablet computer, a smartphone, and a glasses-type computer.

The "glasses-type computer" is a kind of a wearable computer. The glasses-type computer is also called a wearable display, and is a type of computer sit on face like glasses.

The description is provided below of a case where the terminal 3 is a tablet computer or a glasses-type computer. The former and the latter are sometimes referred to as a "tablet terminal 3T" and a "glasses-type terminal 3M", respectively where it is necessary to make a distinction.

Figure 2:
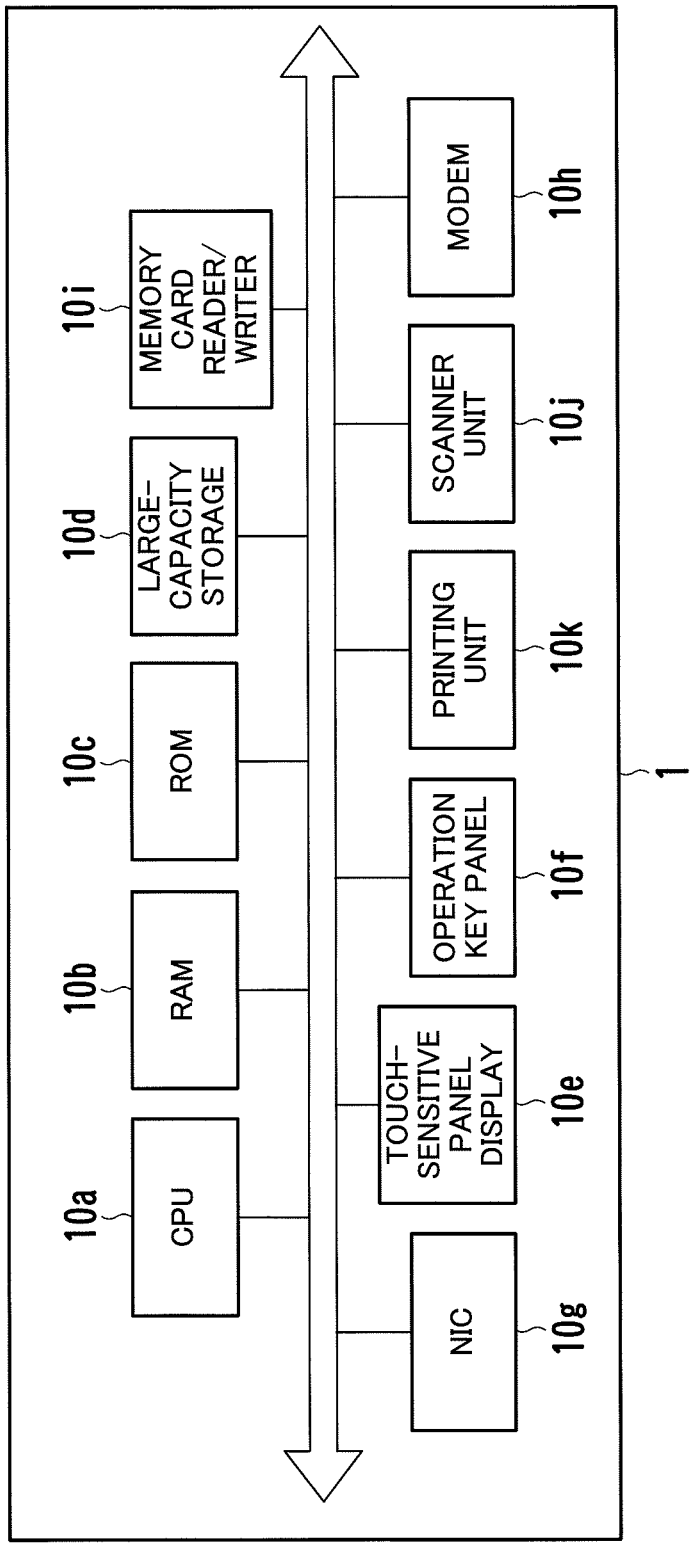
FIG. 2 is a diagram showing an example of the hardware configuration of an image processing apparatus.

FIG. 2 shows an example of the hardware configuration of the image processing apparatus 1.

The image processing apparatus 1 is configured of a Central Processing Unit (CPU) 10a, a Random Access Memory (RAM) 10b, a Read Only Memory (ROM) 10c, a large-capacity storage 10d, a touch-sensitive panel display 10e, an operation key panel 10f, a communication interface card (Network Interface Card: NIC) 10g, a modem 10h, a memory card reader/writer 10i, a scanner unit 10j, a printing unit 10k, and so on.

The touch-sensitive panel display 10e displays, for example, a screen for presenting messages to a user, a screen for allowing the user to input commands or information, a screen for showing the results of processing executed by the CPU 10a, and so on. The touch-sensitive panel display 10e sends a signal indicating a touched position to the CPU 10a.

The operation key panel 10f is a so-called hardware keyboard, and is provided with a start key, a stop key, a function key, and so on.

The communication interface card 10g performs communication with the AR server 2 or the terminal 3 in accordance with a protocol such as Transmission Control Protocol/Internet Protocol (TCP/IP).

The modem 10h sends and receives image data with a facsimile terminal in accordance with a protocol such as G3.

The memory card reader/writer 10i reads out data from a memory card or writes data onto a memory card.

The scanner unit 10j has, for example, an image sensor, a reading slit, a flatbed, an Auto Document Feeder (ADF). When document sheets are placed, the ADF feeds the sheets, one by one, to the reading slit. The flatbed is a component on which the user places the document sheets. When the document sheets are placed on the ADF, the image sensor scans the document sheets passing through the reading slit, and generates imaged data thereof. Alternatively, when the document sheets are placed on the flatbed, the image sensor scans the flatbed to scan the document sheets, and generates image data thereof.

The printing unit 10k has, for example, a feeding unit, a print engine, an ejecting unit. The feeding unit supplies the print engine with a sheet. The print engine prints, onto the sheet, an image captured by the scanner unit 10j, an image received from other devices, and so on. The ejecting unit outputs the sheet having an image thereon to a paper output tray.

The ROM 10c or the large-capacity storage 10d stores therein a program for realizing the functions including the copy function. The ROM 10c or the large-capacity storage 10d also stores an AR content registration program therein. The AR content registration program is a program to generate an AR content corresponding to information missing from the original image (missing information) in printing or reading, and to register such an AR content into the AR server 2.

The programs are loaded into the RAM 10b as necessary and executed by the CPU 10a. Examples of the large-capacity storage 10d include a hard disk drive and a Solid State Drive (SSD).

Figure 3:
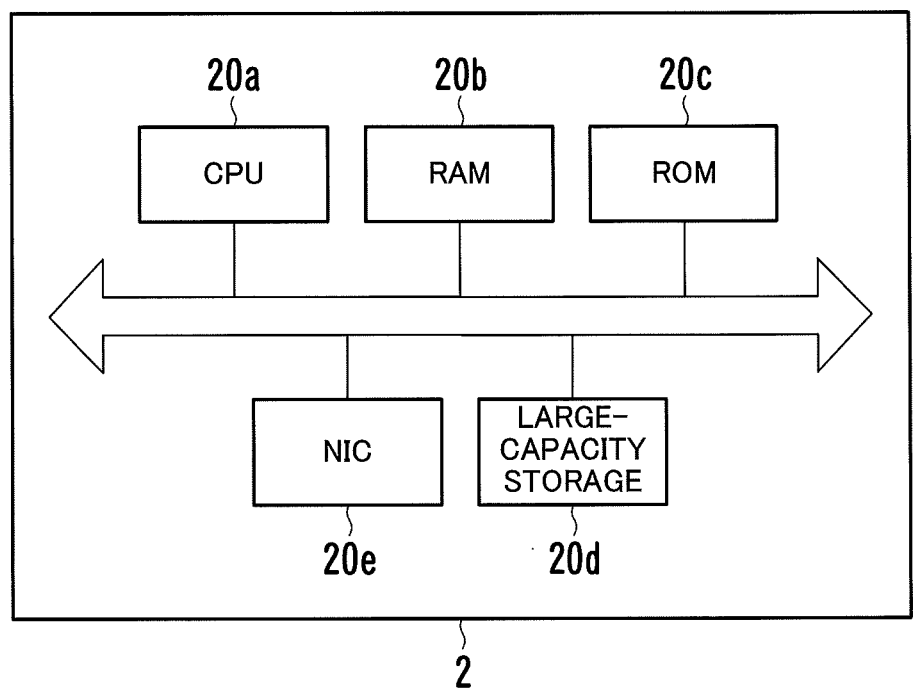
FIG. 3 is a diagram showing an example of the hardware configuration of an AR server.

FIG. 3 shows an example of the hardware configuration of the AR server 2.

The AR server 2 is configured of a CPU 20a, a RAM 20b, a ROM 20c, a large-capacity storage 20d, a communication interface card (NIC) 20e, and so on.

The communication interface card 20e performs communication with, for example, the terminal 3 in accordance with a protocol such as TCP/IP.

The ROM 20c or the large-capacity storage 20d stores therein an AR content management program. The AR content management program is loaded into the RAM 20b and executed by the CPU 20a. Examples of the large-capacity storage 20d include a hard disk drive and an SSD.

Figure 4:
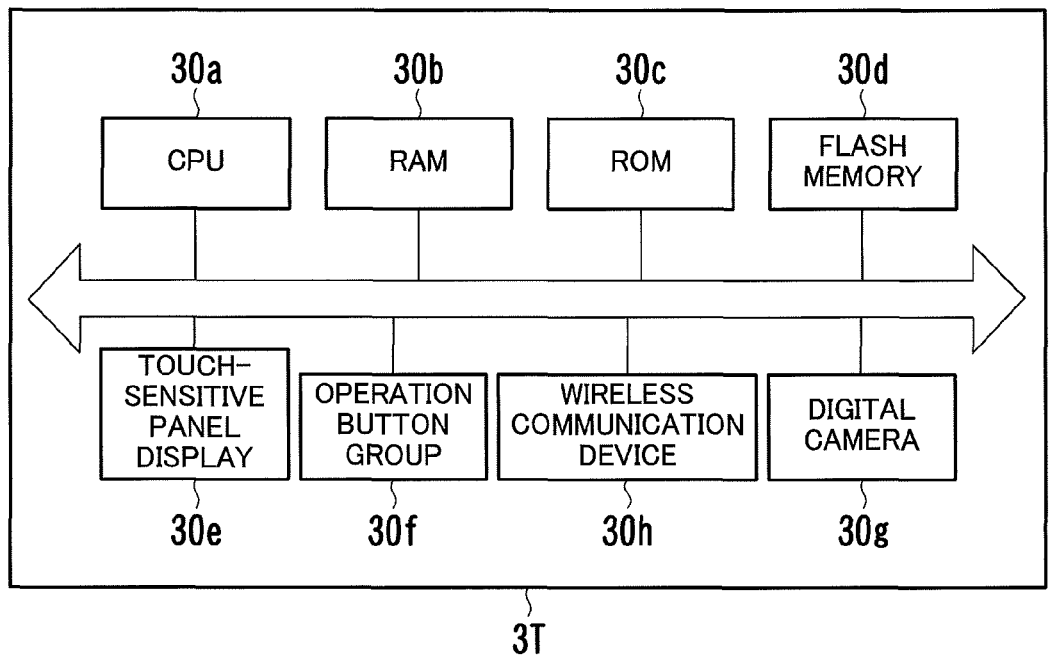
FIG. 4 is a diagram showing an example of the hardware configuration of a tablet terminal.

FIG. 4 shows an example of the hardware configuration of the tablet terminal 3T.

The tablet terminal 3T is configured of a CPU 30a, a RAM 30b, a ROM 30c, a flash memory 30d, a touch-sensitive panel display 30e, an operation button group 30f, a digital camera 30g, a wireless communication device 30h, and so on.

The touch-sensitive panel display 30e is configured of a flat display (liquid-crystal display, for example), a touch-sensitive panel, and so on. The flat display serves to display a variety of screens. The touch-sensitive panel serves to detect a location touched by the user and informs the CPU 30a of the touched location.

The operation button group 30f includes a button for returning to the start screen, a button for confirming something, a button for adjusting sound volume, and a button for switching between ON and OFF of the power supply.

The digital camera 30g photographs different images. The digital camera 30g is used, in particular, to photograph a processed image generated by the image processing apparatus 1.

The wireless communication device 30h performs communication via a base station with the AR server 2 and another device in accordance with a protocol such as TCP/IP. The wireless communication device 30h uses a communication system such as Wi-Fi, Bluetooth (registered trademark), Long Term Evolution (LTE), Wideband-Code Division Multiple Access (W-CDMA), or Personal Handyphone System (PHS).

The ROM 30c or the flash memory 30d stores therein a client program using which an AR content is obtained from the AR server 2. The client program is loaded into the RAM 30b and executed by the CPU 30a.

Figure 5:
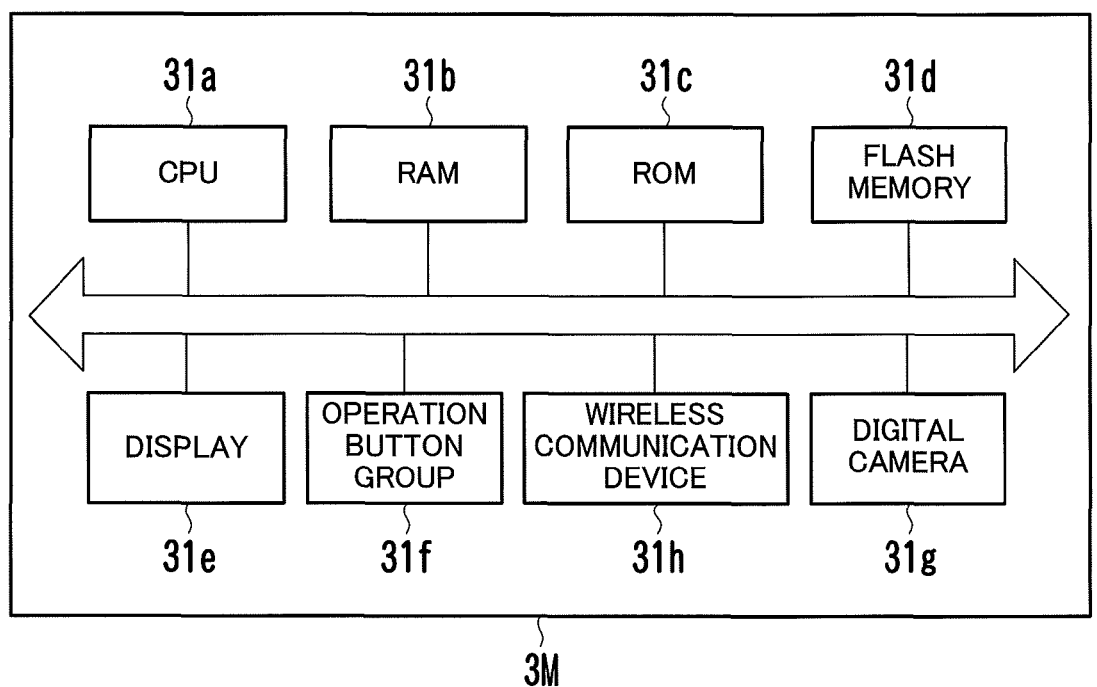
FIG. 5 is a diagram showing an example of the hardware configuration of a glasses-type terminal.

FIG. 5 shows an example of the hardware configuration of the glasses-type terminal 3M.

The glasses-type terminal 3M is configured of a CPU 31a, a RAM 31b, a ROM 31c, a flash memory 31d, a display 31e, an operation button group 31f, a digital camera 31g, a wireless communication device 31h, and so on.

The roles played by the CPU 31a, the RAM 31b, the ROM 31c, the flash memory 31d, the display 31e, the operation button group 31f, the digital camera 31g, and the wireless communication device 31 are basically the same as those played by the CPU 30a, the RAM 30b, the ROM 30c, the flash memory 30d, the touch-sensitive panel display 30e, the operation button group 30f, the digital camera 30g, and the wireless communication device 30h of the tablet terminal 3T.

The touch-sensitive panel display 30e and the display 31e, however, differ from each other in method for reproducing an image. The touch-sensitive panel display 30e is a flat display such as a liquid crystal display as described above. In contrast, the display 31e of the glasses-type terminal 3M reproduces an image by projecting light onto lenses with a projector provided in the root of the temple of the glasses and a prism provided around the ends of the lenses.

The ROM 31c or the flash memory 31d stores therein a client program with which an AR content is obtained from the AR server 2. The client program is loaded into the RAM 31b and executed by the CPU 31a.

Meanwhile, with the image processing system 100, after the image processing apparatus 1 generates a processed image in accordance with an input image, Augmented Reality (AR) technology are used to reproduce, in the terminal 3, information which is a part of information of the input image but is missing in the processed image. At this time, the terminal 3 photographs the processed image.

In a network print job, the input image is inputted to the image processing apparatus 1 in the form of image data through the communication line 4. In a copy job or a scan job, the input image is given to the image processing apparatus 1 in the form of being recorded on a document sheet. The network print job and the copy job both are kinds of the print job. The scan job is to read an input image recorded on a document sheet and to send the input image to another device or a storage destination of the image processing apparatus 1.

The "processed image" is a "print image" printed onto a sheet for the case where the processed image is generated by executing a print job. The "processed image" is "image data" obtained by reading for the case where the processed image is generated by executing a scan job.

The processed image generated by executing a scan job may be hereinafter referred to as a "scanned image" or "scanned image data". The scanned image is displayed or printed in a device which has obtained the scanned image. This makes the scanned image visible, so that the scanned image can be photographed. The scanned image may be a transmission image in monochrome facsimile communication.

Figure 6:
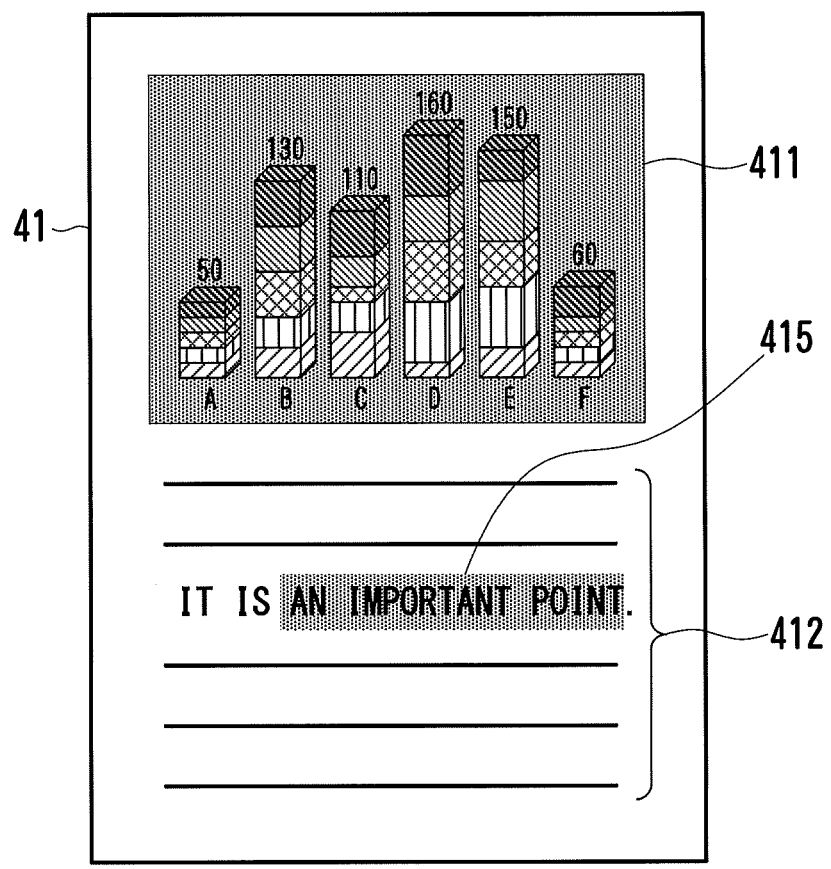
FIG. 6 is a diagram showing an example of an input image.
Figure 7:
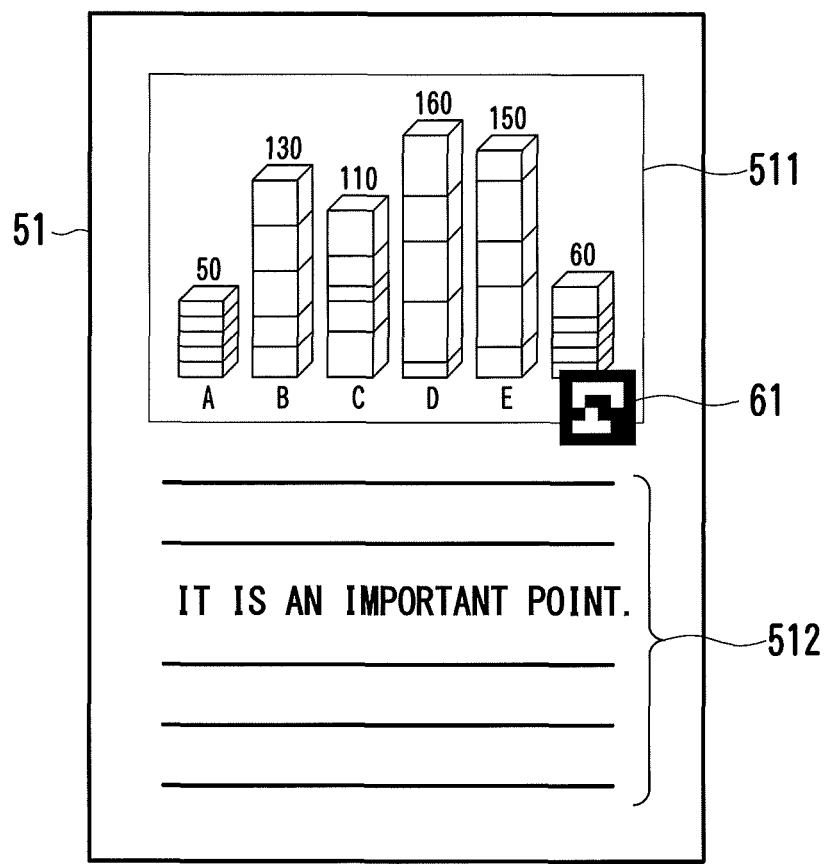
FIG. 7 is a diagram showing an example of a processed image.

FIG. 6 shows an example of an input image 41. FIG. 7 shows an example of a processed image.

Referring to FIG. 6, the input image 41 includes a full-color image 411 and multiple lines of a character string 412.

The full-color image 411 has pixels of colors other than monochrome. The full-color image 411 is, for example, a photograph, a picture, a graph, or a table. The full-color image 411 is of a size substantially equal to the upper half of the input image 41. The monochrome is a gray scale color represented by, for example, black or black material.

The character string 412 is mainly formed of monochrome characters. The character string 412, however, has a color part 415 which is marked in a band-like shape with a color except monochrome and is highlighted. The color part 415 may be provided by making the character in a color except monochrome instead of being marked with a color except monochrome, or, with being marked therewith.

On the other hand, referring to FIG. 7, a processed image 51 includes a monochrome image 511 corresponding to the full-color image 411 of FIG. 6, a monochrome character string 512 corresponding to the character string 412 of FIG. 6, and a monochrome AR marker 61. In the character string 512, characters corresponding to the color part 415 of FIG. 6 are monochrome characters. The character string 512 is not marked.

The processed image 51 is wholly a monochrome image, and has no pixels of colors other than monochrome. Stated differently, in the processed image 51, color information of the information of the input image 41 is missing. The AR marker 61 is added in order to reproduce the missing color information by using the AR technology.

Figure 8:
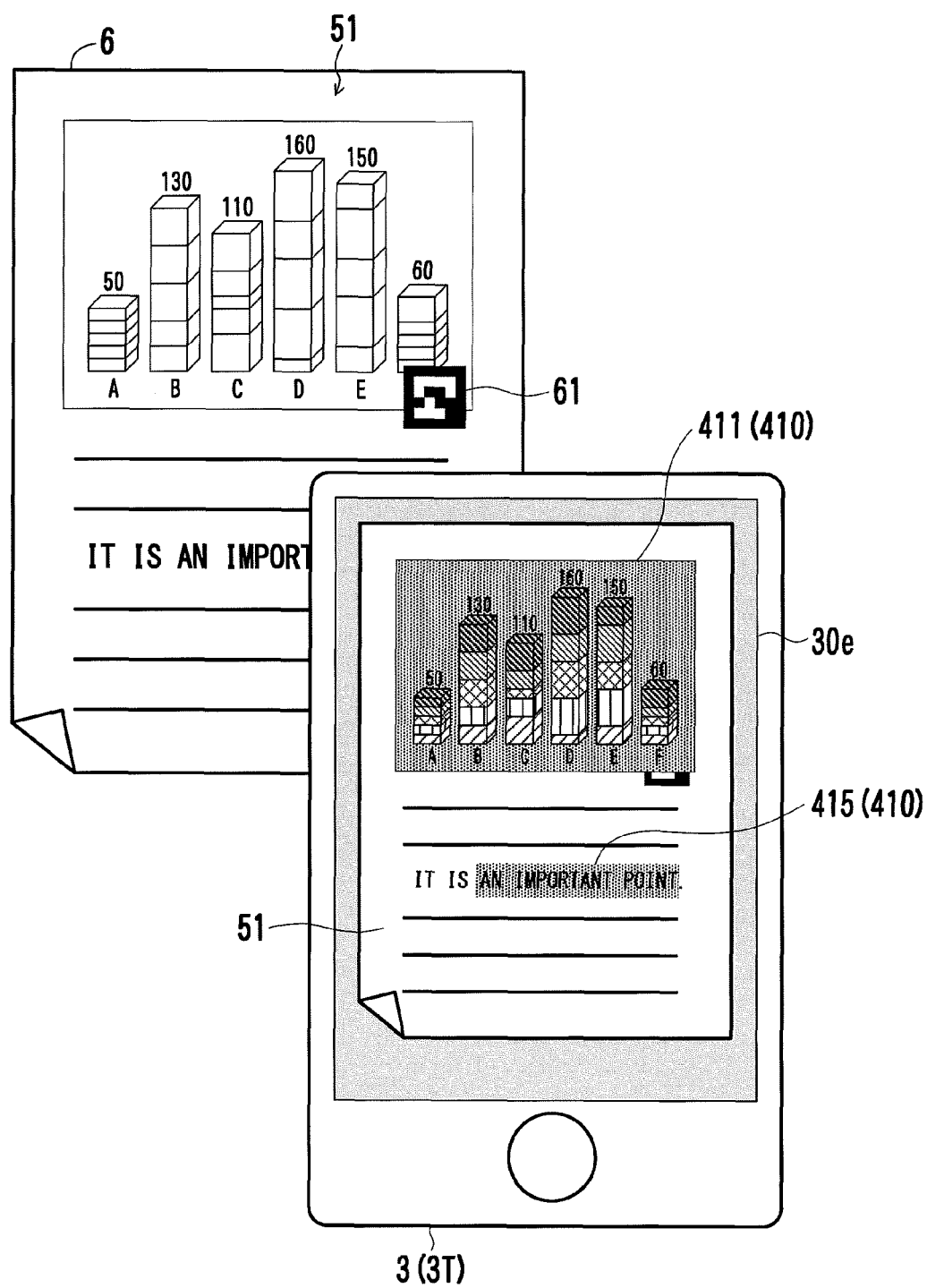
FIG. 8 is a diagram showing an example as to how a processed image is seen via a terminal.

FIG. 8 shows an example as to how the processed image 51 is seen via the terminal 3.

Referring to FIG. 8, the processed image 51 is printed onto a sheet 6. In the illustrated example, the tablet terminal 3T is used as the terminal 3.

The user operates the tablet terminal 3T to run the client program, and uses the tablet terminal 3T to photograph the processed image 51 of the sheet 6 (printed matter). Then, the processed image 51 photographed by the tablet terminal 3T is displayed on the touch-sensitive panel display 30e of the tablet terminal 3T. In addition, the full-color image 411 and the color part 415 are displayed, in a predetermined size, in a manner to be superimposed on a predetermined position of the processed image 51. It seems to the user as if the sheet 6 onto which the input image 41 is printed were photographed.

In the case where the user wears the glasses-type terminal 3M to look at the sheet 6, it seems to the user as if the input image 41 were printed onto the sheet 6.

In this way, the image processing system 100 realizes the Augmented Reality (AR) in which the color information missing in generating the processed image 51 is reproduced within the field of view of the user and is presented to the user.

The description goes on to a mechanism for reproducing missing information.

Figure 9:
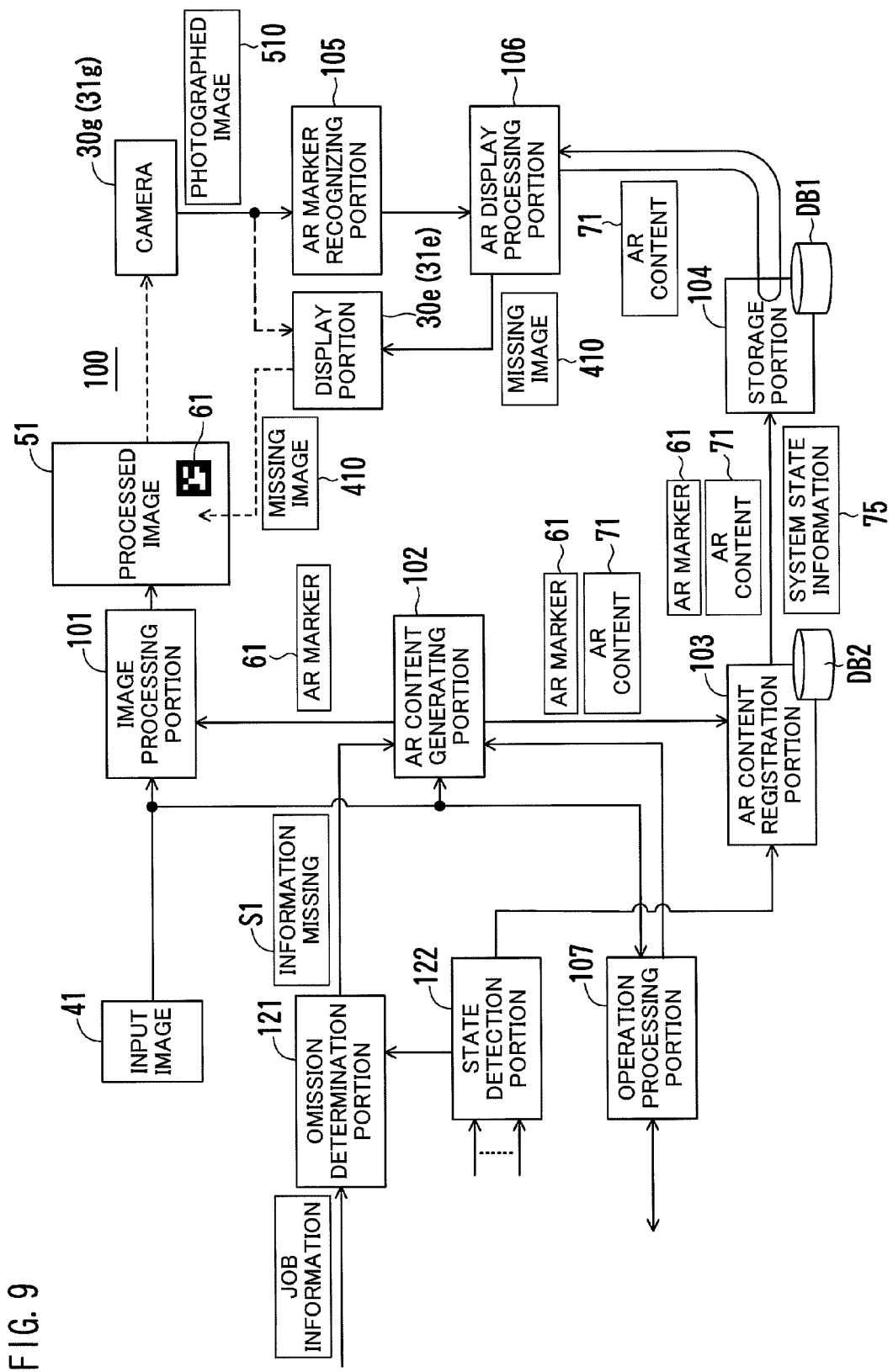
FIG. 9 is a diagram showing an example of the functional configuration of an image processing system.
Figure 11:
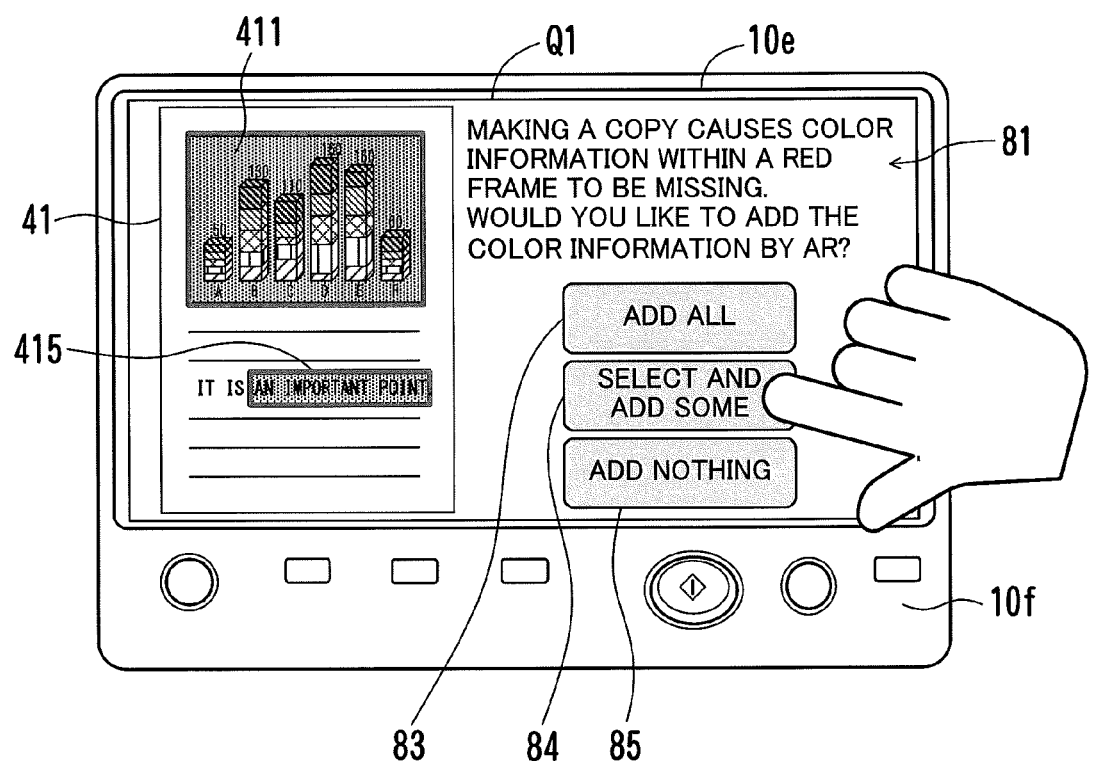
FIG. 11 is a diagram showing an example of a user interface used for designation related to an AR content.
Figure 12:
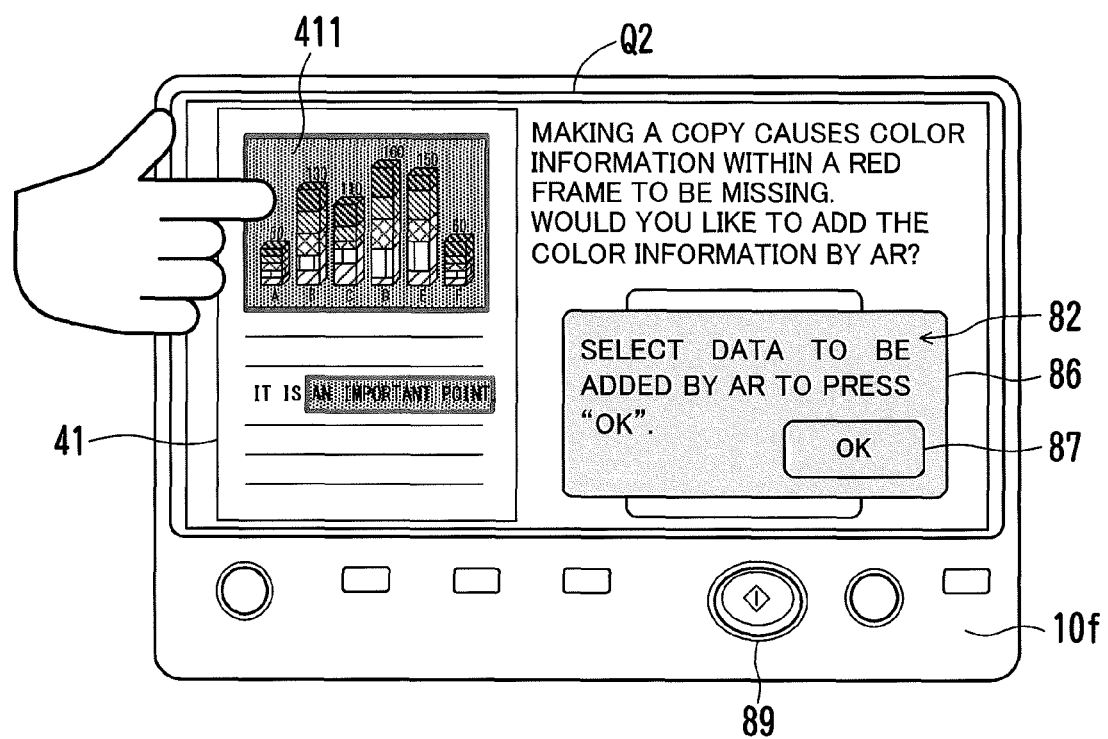
FIG. 12 is a diagram showing an example of a user interface used for designation related to an AR content.
Figure 13:
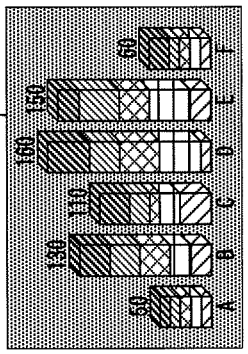
FIG. 13 is a diagram showing an example of data registered in an AR database.
Figure 14:
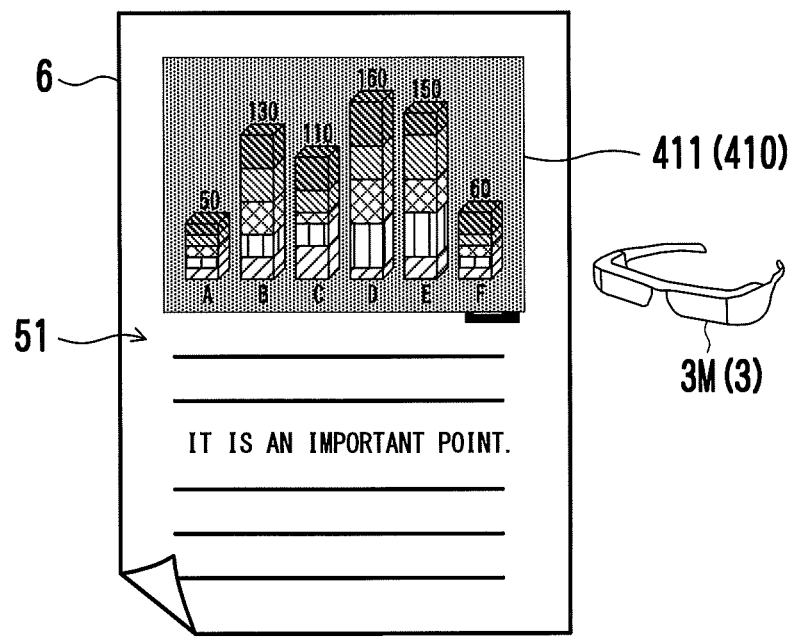
FIG. 14 is a diagram showing an example as to how a processed image is seen via a terminal.

FIG. 9 shows an example of the functional configuration of the image processing system 100. FIG. 10 shows an example of an AR database DB1. FIGS. 11 and 12 show examples of a user interface used for designation related to an AR content. FIG. 13 shows an example of data registered in the AR database DB1. FIG. 14 shows an example as to how the processed image 51 is seen via the terminal 3.

Referring to FIG. 9, the image processing system 100 is configured of an image processing portion 101, an AR content generating portion 102, an AR content registration portion 103, an operation processing portion 107, an omission determination portion 121, a state detection portion 122, and so on. The functions of the individual portions are realized in, for example, the image processing apparatus 1 by the AR content registration program.

The image processing system 100 includes a storage portion 104. The function of the storage portion 104 is realized in, for example, the AR server 2 by implementation of the AR content management program.

The image processing system 100 also includes the digital cameras 30g and 31g, an AR marker recognizing portion 105, and an AR display processing portion 106. The functions of the AR marker recognizing portion 105 and the AR display processing portion 106 are realized in, for example, the terminal 3, by the client program.

The image processing portion 101 adds, to the processed image 51, the AR marker 61 which is an image for identifying information (missing information) missing from information of the input image 41 when the processed image 51 is generated. The details thereof are provided below.

In the case where information is missing in generating the processed image 51, the AR content generating portion 102 gives the image processing portion 101 image data on the AR marker 61. The image processing portion 101 incorporates the image data on the AR marker 61 into image data on the processed image 51.

As to a print job, the image data on the processed image 51 corresponds to print data to be given to the printer engine of the printing unit 10k. As to a scan job, the image data on the processed image 51 corresponds to scanned image data to be transferred to a designated storage destination.

The size of the AR marker 61 may be fixed or be changed. At which position in the processed image 51 the AR marker 61 is to be added is selectable appropriately depending on the position of a missing image 410 described later.

As to a network print job, where a print target is described in Page Description Language (PDL), the AR marker 61 can be added in the course of Raster Image Processor (RIP) processing of interpreting the content of description to create print data.

When receiving, from the omission determination portion 121, a notice of a determination result S1 indicating that information is missing, the AR content generating portion 102 generates an AR marker 61, or, determines one of AR markers stored in advance to be an AR marker 61 corresponding to the input image 41. The AR content generating portion 102 gives image data on the AR marker 61 to the image processing portion 101.

When receiving, from the omission determination portion 121, a notice of the determination result S1 indicating that information is missing, the AR content generating portion 102 extracts, from the input image 41, a missing image 410 showing a part of the missing information, and generates an AR content 71 corresponding to the missing information. The AR content generating portion 102 then conveys the AR marker 61 and the AR content 71 to the AR content registration portion 103.

The AR content 71 includes, at least, image data on the missing image 410 of the input image 41, position data indicating the positional relationship between the AR marker 61 and the missing image 410, and size data indicating the size relationship between the AR marker 61 and the missing image 410. For example, in the case of printing the input image 41 of FIG. 6 in monochrome, the full-color image 411 and the color part 415 are the missing images 410.

The position data indicates, for example, the degree to which the central position of the AR marker 61 and the central position of the missing image 410 are shifted from each other horizontally and vertically. The size data may indicate a ratio of the size of the missing image 410 to the size of the AR marker 61.

The AR content registration portion 103 receives the AR marker 61 and the AR content 71 from the AR content generating portion 102, corresponds the AR marker 61 and the AR content 71 to each other, and stores the resultant in the storage portion 104. At this time, if the AR content generating portion 102 sends the AR marker 61 and the AR content 71 which are in a state of corresponding to each other, then the AR marker 61 and the AR content 71 may be transferred as-is to the storage portion 104. Thereby, the AR marker 61 and the AR content 71 remaining corresponding to each other are stored into the storage portion 104. In short, it is preferable that the function of the AR content registration portion 103 is to call the AR content 71 in response to a notice of the AR marker 61 sent from the terminal 3 to the storage portion 104.

When storing the AR content 71 into the storage portion 104, the AR content registration portion 103 corresponds user authentication information of a user, who has instructed to execute the job, to the AR marker 61, and stores the resultant into the storage portion 104. It is also possible to correspond device information for identifying the terminal 3 used by the user to the AR marker 61 and store the resultant into the storage portion 104.

When receiving the AR marker 61 and the AR content 71 from the AR content registration portion 103, the storage portion 104 corresponds the AR marker 61 and the AR content 71 to each other and stores the resultant into the AR database DB1. In the example of FIG. 10, the full-color image 411 and the color part 415 which are image data (missing image) are associated with the AR marker 61 and are stored in the AR database DB1.

The AR marker 61 may be stored in the AR database DB1 in the following manner: A pattern file showing pixel values of pixels of the AR marker 61 is stored in the AR database DB1; and a management number given to the AR marker 61 is stored in the AR database DB1. In the latter case, it is preferable to correspond the management number and the pattern file to each other, store the resultant, and call the pattern file based on the management number. The same is similarly applied to storage of image data (missing image).

The digital cameras 30g and 31g take an image of the processed image 51 which is printed or displayed, specifically, the processed image 51 on a printed matter or the processed image 51 on the screen of the display.

The AR marker recognizing portion 105 uses a known algorithm to recognize the AR marker 61 contained in the photographed image 510 of the processed image 51 by the digital cameras 30g and 31g. The AR marker recognizing portion 105 then conveys, to the AR display processing portion 106, array information on pixel value of the AR marker 61 recognized.

When receiving the array information on pixel value from the AR marker recognizing portion 105, the AR display processing portion 106 sends the array information to the storage portion 104, and obtains, from the storage portion 104, the AR content 71 stored therein corresponding to the AR marker 61. At this time, the storage portion 104 uses, as a search key, the array information sent from the AR display processing portion 106 to search for one or more AR markers (pattern files) registered in the AR database DB1. The storage portion 104 regards a pattern file which has a degree of agreement with the array information equal to or greater than a predetermined value, and has the greatest degree of agreement as the AR marker 61 recognized by the AR marker recognizing portion 105. The storage portion 104 then sends the AR content 71 corresponding to the AR marker 61 to the AR display processing portion 106.

In the case where the AR display processing portion 106 accesses the storage portion 104, user authentication information on the user of the terminal 3 and device information on the terminal 3 are sent to the storage portion 104, so that the storage portion 104 performs user authentication based on the information received.

When receiving the AR content 71 from the storage portion 104, the AR display processing portion 106 displays the AR content 71 above the processed image 51 photographed by the digital cameras 30g and 31g. To be specific, based on the position data and the size data contained in the AR content 71, the AR display processing portion 106 sets the position and size of the missing image 410 depending on the position and size of the AR marker 61 in the photographed image 510 and displays the missing image 410 in such a manner that the input image 41 is reproduced.

In the case where the processed image 51 printed or displayed is photographed by the digital camera 30g of the tablet terminal 3T, the missing image 410 is displayed in a manner to be combined with the processed image 51 displayed on the touch-sensitive panel display 30e functioning as a monitor display portion for photograph as shown in the example of FIG. 8.

In the case where a printed matter having the processed image 51 thereon is photographed by the digital camera 31g of the glasses-type terminal 3M, the display 31e functioning as a display unit is used to project the missing image 410 on the glass lenses to show the user as if the missing image 410 were printed onto the printed matter. Likewise, in the case where the processed image 51 displayed is photographed by the digital camera 31g of the glasses-type terminal 3M, the missing image 410 is projected onto the glass lenses so as to show the user as if the input image 41 were displayed.

According to the conventional techniques discussed earlier, the input image is partly missing and a handwritten note is made on a printed matter in which missing information is added in the form of two-dimensional barcode. In such a case, when printing is carried out with the missing part reproduced based on the two-dimensional barcode, the handwritten note is not reproduced on the printed matter. For this reason, it is necessary to compare, for confirmation, the printed matter in which the note is made against the printed matter reproduced. In contrast, according to this embodiment, the missing image 410 is displayed as if the missing image 410 were printed on a printed matter on which a handwritten note is made. Therefore, it seems to the user as if the handwritten note were made on the input image.

When the input image 41 has a plurality of missing images 410, the operation processing portion 107 displays the screen (user interface) Q1 shown in FIG. 11 on the touch-sensitive panel display 10e. The screen Q1 has the input image 41, a message 81 indicating that information is to be missing, and three buttons 83, 84, and 85 related to designation of the missing image 410. A part resulting in the missing image 410 of the input image 41 is surrounded by a thick frame of a predetermine color (red, for example). This shows that the part can be selected as a reproduction target by using the AR technology. In the illustrated example of FIG. 11, each of the full-color image 411 and the color part 415 is surrounded by a frame.

When designating all of the missing images 410, the user presses the button 83. When designating one or more of the missing images 410 selectively, the user presses the button 84. When designating no missing image 410, the user presses the button 85.

In response to the button 84 pressed by the user, the operation processing portion 107 replaces the screen Q1 with a screen Q2 shown in FIG. 12 to display the screen Q2 on the touch-sensitive panel display 10e. The screen Q2 is a screen having a message area 86 to cover the buttons 83, 84, and 85 on the screen Q1. The message area 86 has a message 82 for prompting the user to designate a missing image 410 and a button 87 with which the user enters completion of the designation.

FIG. 12 shows a state in which the user touches the full-color image 411 of the input image 41 on the screen Q2.

The user touches, in the input image 41, a part enclosed by the frame to designate the part as a reproduction target by using the AR technology.

The operation processing portion 107 receives an entry, by the user, of designation of a missing image 410 to be displayed as the AR content 71 of the missing images 410. To be specific, the operation processing portion 107 receives operation of touching, in the input image 41, any of the parts enclosed by frames on the screen Q2. When the user designates one or more of the missing images 410 and presses the button 87, the operation processing portion 107 informs the AR content generating portion 102 which of the missing images 410 is designated by the user.

When being informed accordingly, the AR content generating portion 102 generates an AR content 71 which does not include the missing images 410 except the designated missing image 410 in such a manner that, among the missing images 410, the missing image other than the designated missing image 410 is excluded from display targets. The AR content 71 generated is stored into the storage portion 104. In such a case, therefore, the AR display processing portion 106 displays, of the missing images 410, only the missing image 410 designated by the user.

It is supposed that, among the full-color image 411 and the color part 415 which are the missing images 410 of the input image 41, the user designates only the full-color image 411 as a reproduction target by using the AR technology. Then, it is supposed that the image processing apparatus 1 is caused to execute a print job of printing the processed image 51 corresponding to the input image 41, and that the user looks at a printed matter obtained by the print job through the lenses of the glasses-type terminal 3M.

In such a case, as shown in FIG. 13, image data on the full-color image 411 is stored in the AR database DB1, and image data on the color part 415 is not stored therein. In short, the AR content 71 has no image data on the color part 415. When the user sees the printed matter (sheet 6 onto which the processed image 51 is printed), it seems to the user as if the full-color image 411 were printed onto the sheet 6 as shown in FIG. 14. However, as to a part corresponding to the color part 415 of the input image 41 in the processed image 51, the processed image 51 is seen as-is.

Referring back to FIG. 9, when any of cases (a) through (f) described below is true, the omission determination portion 121 determines that the whole or a part of the input image 41 is to be missing in generating the processed image 51, and informs the AR content generating portion 102 of the determination result S1 indicating that information is missing. Stated differently, in any of cases (a) through (f), the image processing system 100 adds the AR marker 61 to the processed image 51, generates the AR content 71, and stores the AR content 71 into the storage portion 104.

Cases (a) through (e) are related to a print job of generating a print image as the processed image 51. Case (f) is related to a scan job of generating scanned image data as the processed image 51 by the image processing apparatus 1.

Case (a): At least a part of the input image 41 is a color image, and the processed image 51 is a monochrome image.

Case (b): Due to a shortage of a color material such as toner or ink, the processed image 51 corresponding to the whole input image 41 cannot be printed.

Case (c): Due to paper out, a plurality of processed images 51 to be printed for the input image 41 cannot be printed.

Case (d): The input image 41 is reduced at a scale ratio based on which the font is reduced to a predetermined size or smaller, which makes characters illegible, and printing is carried out.

Case (e): Since the size of a sheet is smaller than the size of the input image 41, a part of the processed image 5 cannot be printed.

Case (f): Due to a shortage of a storage capacity of a storage destination of the processed image 51, it is necessary to make a resolution to read the input image 41 lower than a normal value. In short, high-resolution image information of the input image 41 is missing.

The omission determination portion 121 determines to which of cases (a) through (f) a job execution state applies based on, for example, the job information indicating the content of a job given to the image processing apparatus 1 and the state of the image processing apparatus 1 detected by the state detection portion 122.

It is supposed that the image processing apparatus 1 is a monochrome device with which printing is limited to monochrome printing, and that the image processing apparatus 1 is given a network print job of designating color printing. Such a case corresponds to case (a). It is supposed that a printer engine of the image processing apparatus 1 uses an electrophotographic technology, and that the image processing apparatus 1 is in a toner near-empty state under which the small amount of toner is left enough to print a small image only such as the AR marker 61. Such a case corresponds to case (b). It is supposed that the image processing apparatus 1 is given a scan job such as a facsimile transmission job of designating reading at a resolution lower than that for a copy job. Such a case corresponds to case (f).

The state detection portion 122 monitors the state of the image processing apparatus 1 concerned with executing a print job and a scan job. In response to an inquiry from the omission determination portion 121, the state detection portion 122 informs the omission determination portion 121 of the current state.

In addition, the state detection portion 122 monitors a change in state which is probably resolved later, such as a toner/sheet shortage state, to detect that the cause which leads to information missing of the input image 41 is resolved. In response to the detection, the state detection portion 122 informs the AR content registration portion 103 accordingly.

Figure 15:
FIG. 15 is a diagram showing an example of a state change database.

In order to implement such operation, the state detection portion 122 manages a state change database DB2 shown in FIG. 15. In the state change database DB2, the AR marker 61 is associated with the cause of the missing and a state of the image processing apparatus 1 related to the cause.

At a time point of starting monitoring a change in state, namely, immediately after the AR content registration portion 103 corresponds the AR marker 61 and the AR content 71 to each other to store the resultant into the storage portion 104, the image processing apparatus 1 is in the state where a cause of the missing is occurring. Thereafter, when the cause is resolved, the state change database DB2 is updated in such a manner that the cause is resolved. After that, if the cause occurs again, the state change database DB2 is updated again to show that the cause is occurring. Thereafter, the state change database DB2 is updated in response to the cause being resolved or occurred.

In a state where the storage portion 104 stores therein the AR marker 61 and the AR content 71, when receiving, from the state detection portion 122, a notice indicating that the cause leading to information missing of the input image 41 in generating the AR content 71 is resolved, the AR content registration portion 103 stores system state information 75 indicating the fact into the storage portion 104 in association with the AR marker 61.

Figure 16A:
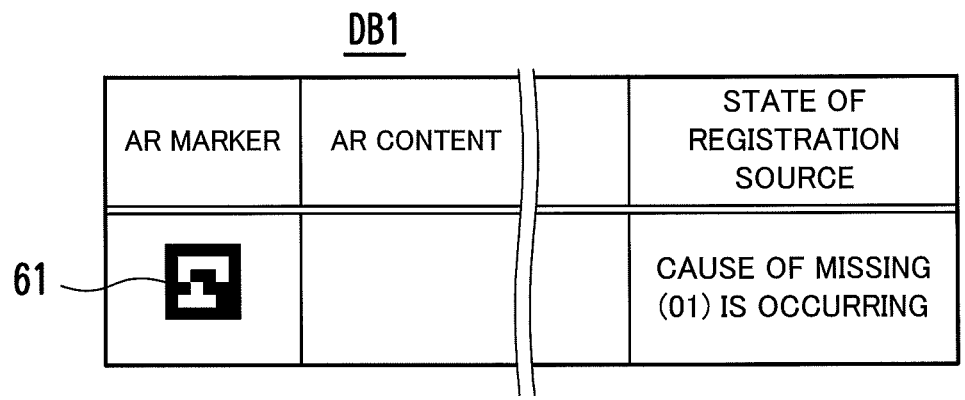
FIG. 16(A) and FIG. 16(B) are diagrams showing an example as to how an AR database is updated in response to a change in state of an image processing apparatus.
Figure 16B:
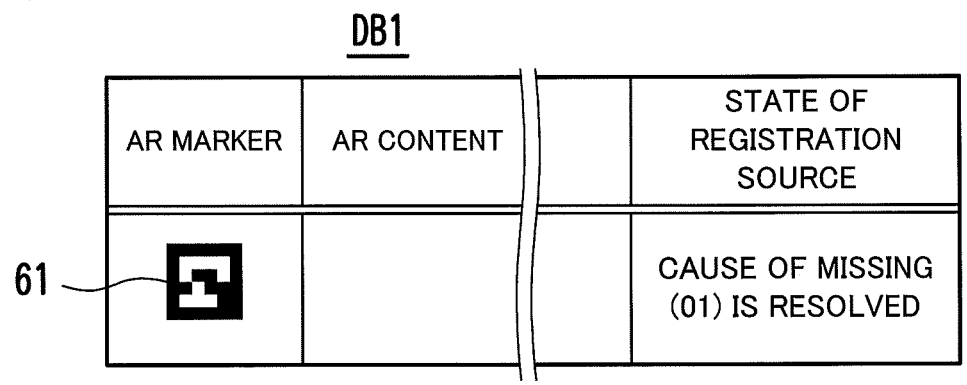

For example, when receiving the AR content 71 from the AR content registration portion 103, the storage portion 104 receives information indicating the cause leading to information missing, and saves the information as a "state of registration source" to the AR database DB1 as shown in FIG. 16(A). Thereafter, when receiving the system state information 75, the storage portion 103 replaces the details of the "state of registration source" with the details depending on the system state information 75 as shown in (B) of FIG. 6. In other words, the system state information 75 is stored in the AR database DB1.

Where the system state information 75 is stored in the storage portion 104, the AR display processing portion 106 displays the system state information 75 together with the AR content 71. An example of the case where the system state information 75 is displayed is described below.

Figure 17:
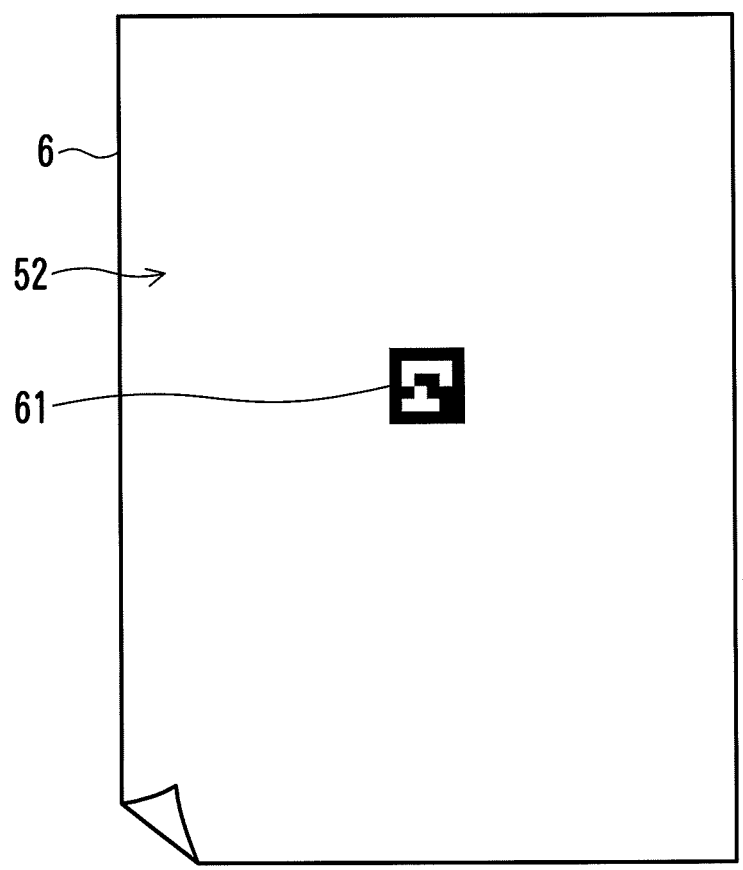
FIG. 17 is a diagram showing an example of a processed image.
Figure 18A:
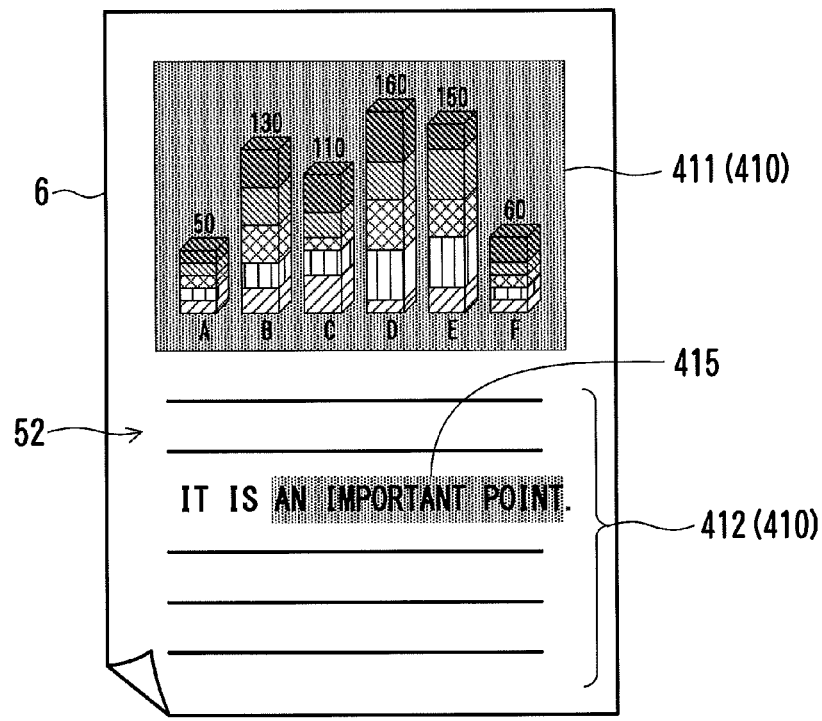
FIG. 18(A) and FIG. 18(B) are diagrams showing an example as to how a processed image is seen via a terminal.
Figure 18B:
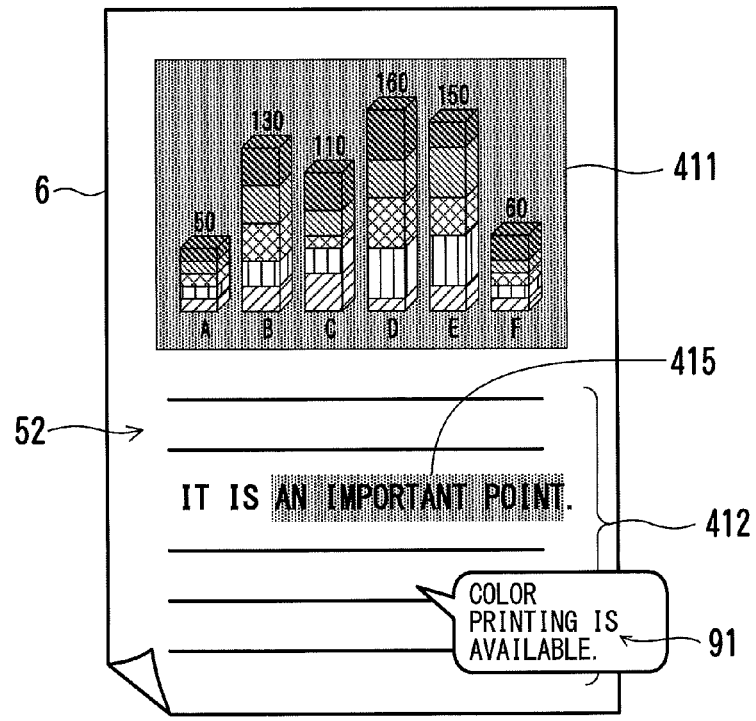

FIG. 17 shows an example of a processed image 52. FIG. 18(A) and FIG. 18(B) show an example as to how the processed image 52 is seen via the terminal 3.

The processed image 52 shown in FIG. 17 has only the monochrome AR marker 61. Referring to FIG. 17, the processed image 52 is printed on the sheet 6.

The processed image 52 is generated, for example, in the following case: When a print job of printing the input image 41 is given, the image processing apparatus 1 runs short of toner for color printing, e.g., toner of yellow, magenta, and cyan, and has a small amount of toner of black. In short, at a time when the processed image 52 is generated, the state of the image processing apparatus 1 corresponds to both cases (a) and (b).

When the user looks at the processed image 52 through the terminal 3, the terminal 3 recognizes the AR marker 61, and obtains, from the AR database DB1, the AR content 71 corresponding to the AR marker 61. When the processed image 52 is generated, all the information of the input image 41 is missing.

Therefore, the entirety of the input image 41 is registered as the missing image 410 in the AR database DB1 when the terminal 3 accesses the AR database DB1. The terminal 3 displays the input image 41 (the full-color image 411 and the character string 412) in a manner to be superimposed on the processed image 52 based on the AR content 71 obtained. Thereby, it seems to the user as if the input image 41 were printed in color onto the sheet 6.

It is supposed that, after the processed image 52 is printed, toner is added to the image processing apparatus 1, which changes the state of the image processing apparatus 1 from the toner near-empty state to a color printing ready state. In such a case, the state detection portion 122 detects the change, and the AR content registration portion 103 corresponds the system state information 75 and the AR marker 61 to each other to store the resultant into the storage portion 104. The system state information 75 may show the state of the post-change image processing apparatus 1.

After the system state information 75 is stored, the user looks at the processed image 52 through the terminal 3. Then, as shown in FIG. 18(B), the input image 41 is displayed in a manner to be superimposed on the processed image 52, and a message 91 in accordance with the details of the system state information 75 is displayed. In the illustrated example of FIG. 18(B), the message 91 is a sentence to convey that printing in color is available.

The user is informed that printing in color is available through the message 91. The user may cause the image processing apparatus 1 to print the input image 41 when the need arises.

In the case where the state of the image processing apparatus 1 is changed from the state where color printing is available to the state where color printing is not available, the details of the "state of registration source" in the AR database DB1 is so updated to indicate the fact. The message 91 is not displayed after the update.

The description goes on to an example where, of information of the input image 41, information other than the color information is missing.

Figure 19:
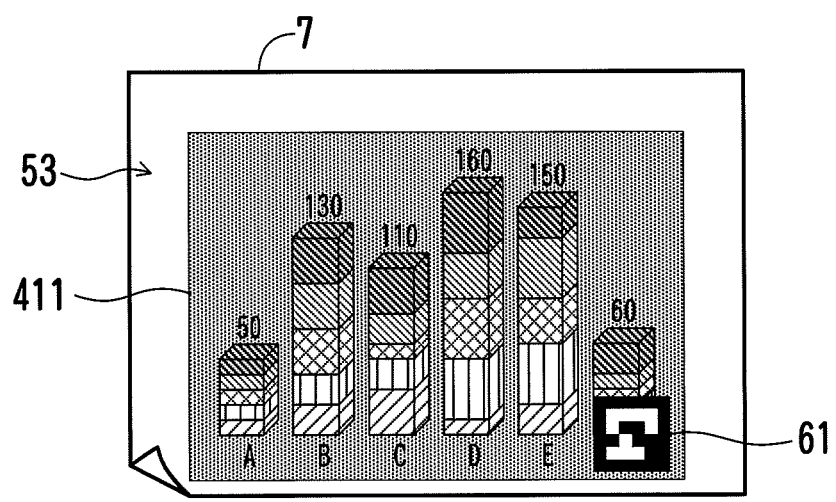
FIG. 19 is a diagram showing an example of a processed image.
Figure 20:
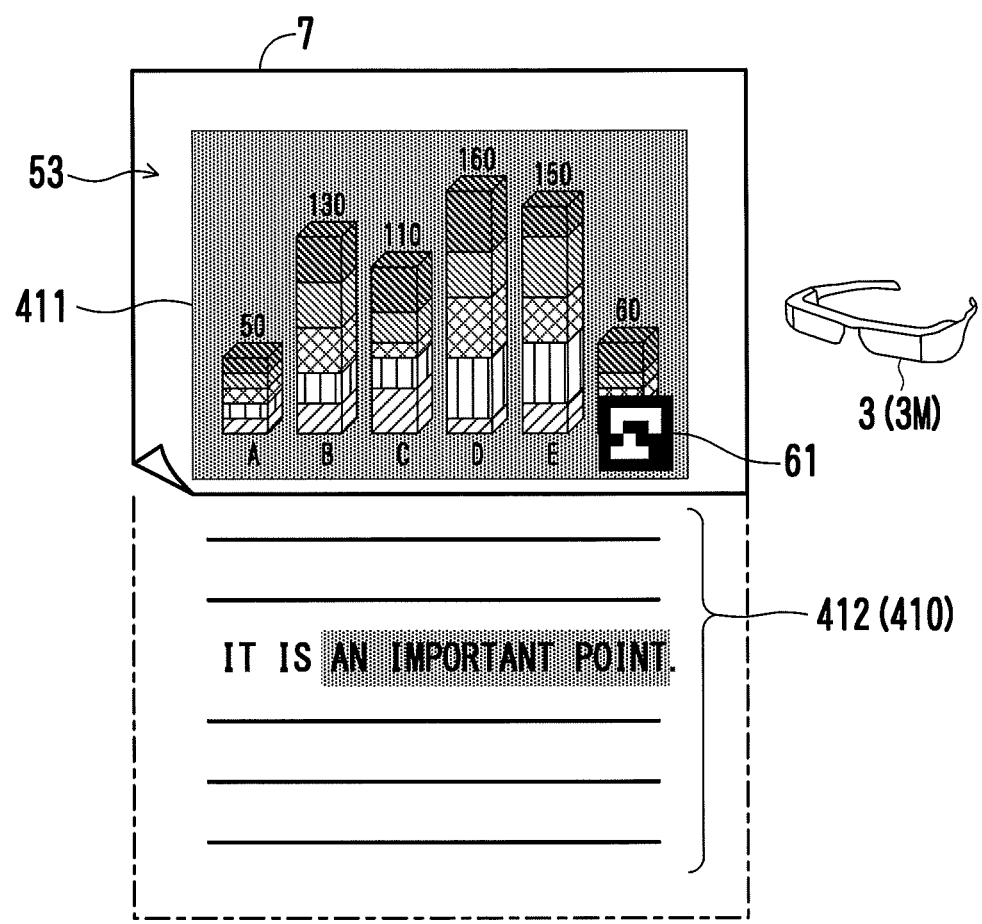
FIG. 20 is a diagram showing an example as to how a processed image is seen via a terminal.
Figure 21:
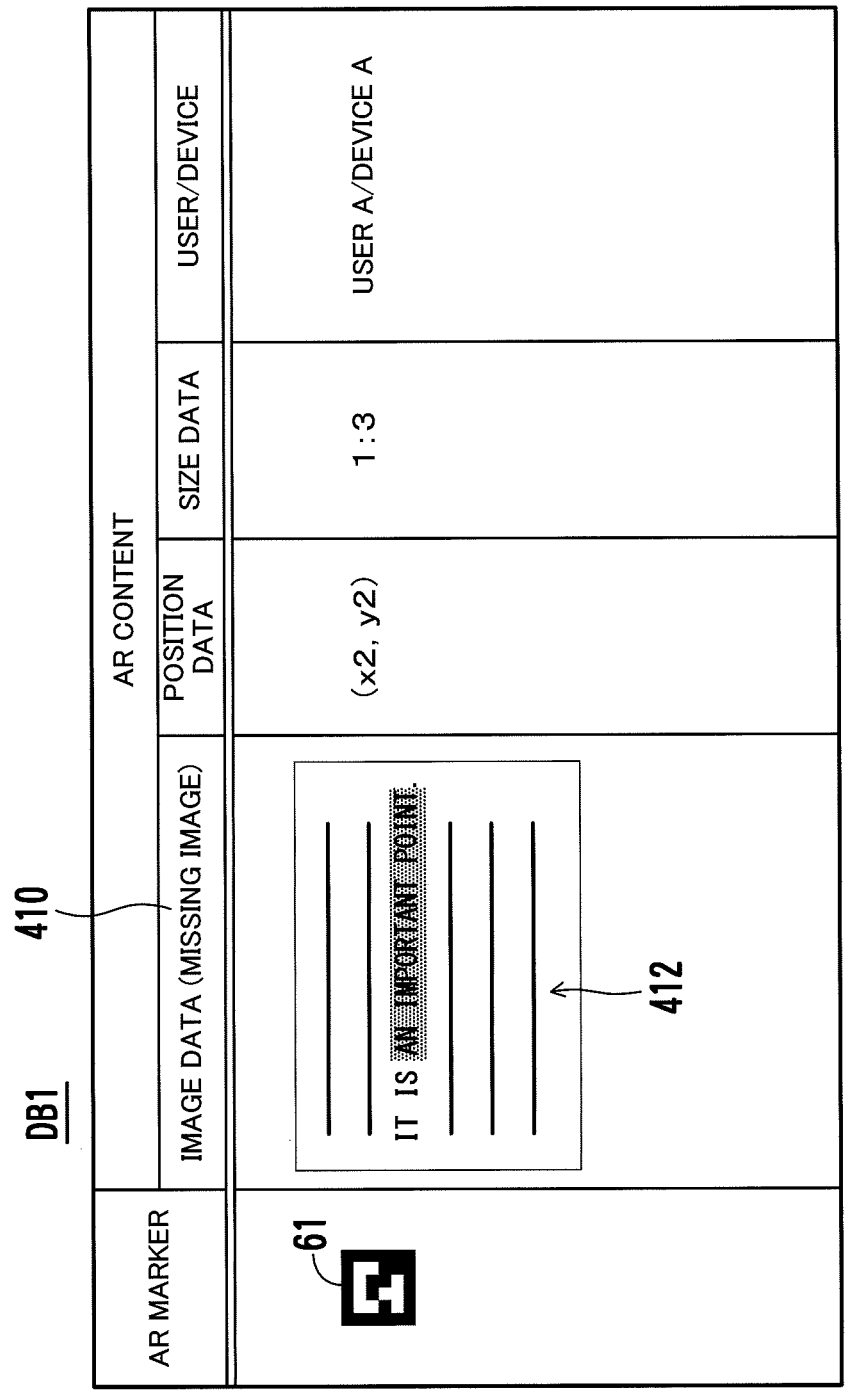
FIG. 21 is a diagram showing an example of data registered in an AR database.

FIG. 19 shows an example of a processed image 53. FIG. 20 shows an example as to how the processed image 53 is seen via the terminal 3. FIG. 21 shows an example of data registered in the AR database DB1.

Referring to FIG. 19, the processed image 53 includes the full-color image 411 and the AR marker 61. The processed image 53, however, does not have a part corresponding to the character string 412 of the input image 41. The color of the AR marker 61 may be monochrome and other colors. In the illustrated example of FIG. 19, the processed image 53 is printed on the sheet 7.

The processed image 53 is generated for the case where the size of the sheet 6 available for printing by the image processing apparatus 1 is smaller than the size of the input image 41. In other words, at a time point when the processed image 53 is generated, the state of the image processing apparatus 1 corresponds to case (e) as discussed above. In the description on FIGS. 19 and 20, it is supposed that the size of the sheet 7 is, for example, A4 (210 mm×297 mm), and the size of the input image 41 is, for example, A3 (297 mm×420 mm).

Since A4 size is equal to a half of A3 size, the sheet 7 is used with the orientation (portrait/landscape) of the input image 41 rotated by 90 degrees. This makes it possible to print a half of the input image 41 onto the sheet 7 at 100% scaling factor. The processed image 53 is generated by such printing at 100% scaling factor.

In generating the processed image 53, of the input image 41, image information represented by the character string 412 is missing. The AR marker 61 is added to reproduce the missing image information by using the AR technology.

Where the processed image 53 is printed, image data on the character string 412 is stored into the AR database DB1 as shown in FIG. 21. Then, the user looks at the sheet 7 onto which the processed image 53 is printed, for example, through the glasses-type terminal 3M, as shown in FIG. 20. Thereby, it seems to the user as if a printed matter were present onto which the character string 412 and the processed image 53 are laid out side by side.

Figure 22:
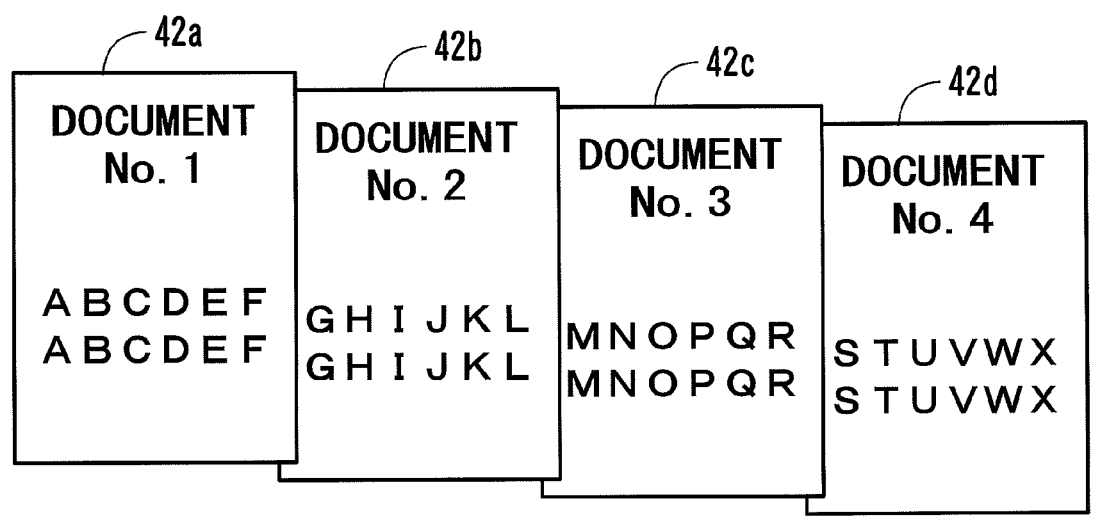
FIG. 22 is a diagram showing an example an input image.
Figure 23:
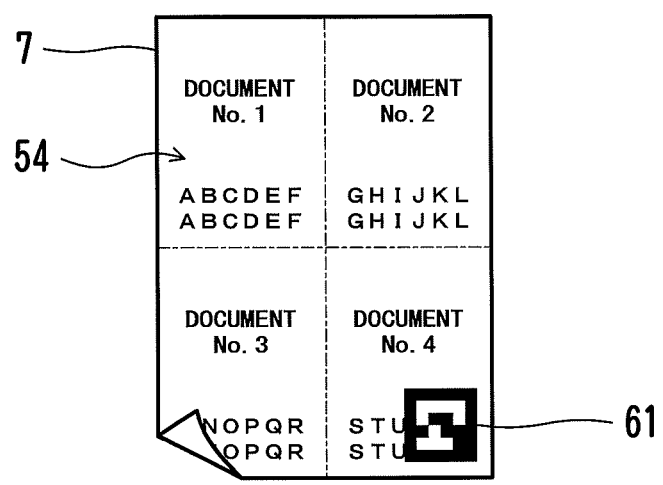
FIG. 23 is a diagram showing an example of a processed image.
Figure 24:
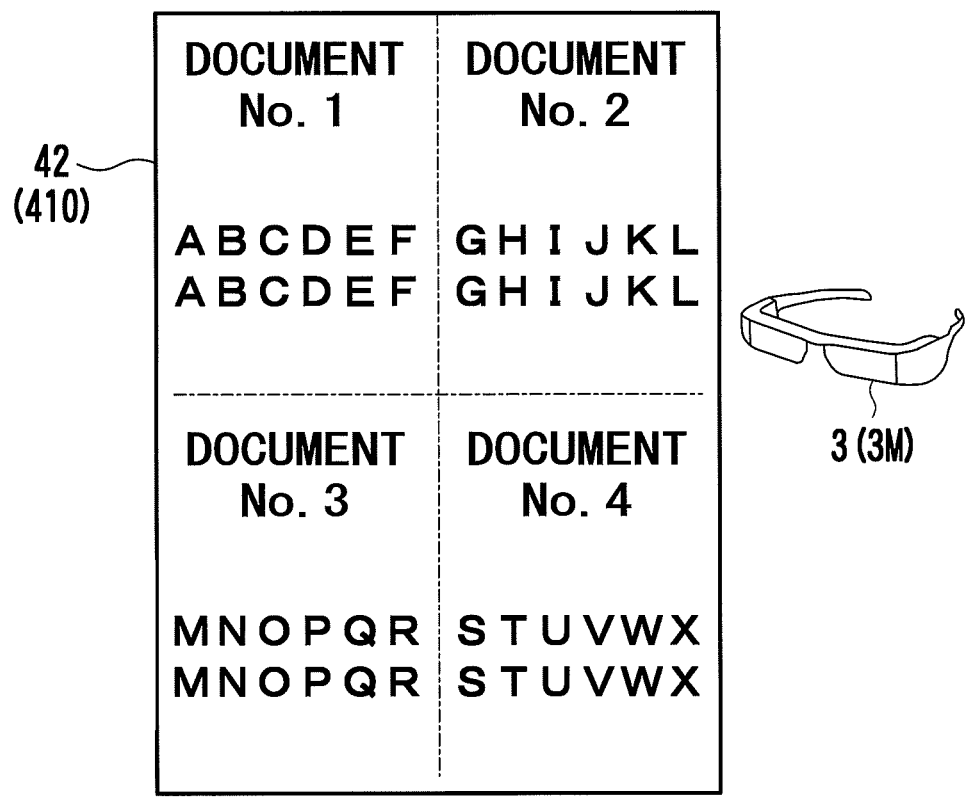
FIG. 24 is a diagram showing an example as to how a processed image is seen via a terminal.

FIG. 22 shows an example of input images 42a, 42b, 42c, and 42d. FIG. 23 shows an example of a processed image 54. FIG. 24 shows an example as to how the processed image 54 is seen via the terminal 3.

At least any one of the four input images 42a, 42b, 42c, and 42d has character information. The input images 42a, 42b, 42c, and 42d are equal to each other in image size.

As shown in FIG. 23, the processed image 54 is provided by reducing each of the four input images 42a, 42b, 42c, and 42d to print the resultant images onto a sheet 7 having a size equal to or smaller than those of the input images 42a, 42b, 42c, and 42d in a grid-pattern of two rows and two columns (so-called 4-in-1 printing).

Before the processed image 54 is printed, the input images 42a, 42b, 42c, and 42d are reduced. This sometimes causes font sizes of some characters of the input images 42a, 42b, 42c, and 42d to be excessively small in the processed image 54. Stated differently, at least a part of the character information of the input images 42a, 42b, 42c, and 42d is missing in the processed image 54. The AR marker 61 is added in order to reproduce the missing character information by using the AR technology. The case where the image processing apparatus 1 generates the processed image 54 in this manner corresponds to case (d) as discussed above.

In the case where the processed image 54 is generated, even if any of the input images 42*a*, 42*b*, 42*c*, and 42*d* does not include character information of a size of a font which is reduced to be too small to be legible, the entirety of each of the input images 42*a*, 42*b*, 42*c*, and 42*d* is regarded as the missing image 410. All the four missing images 410 are associated with the AR marker 61 and are stored in the AR database DB1. This enables the user to see the result of 4-in-1 combined by using the AR technology.

The user looks at the sheet 7 having the processed image 54 printed thereon through, for example, the glasses-type terminal 3M as shown in FIG. 24. Thereby, it seems to the user as if an image 42 in which the input images 42*a*, 42*b*, 42*c*, and 42*d* are laid out in two rows and two columns without being reduced were present.

Hereinafter, operation of the image processing apparatus 1 is described with reference to flowcharts.

Figure 25:
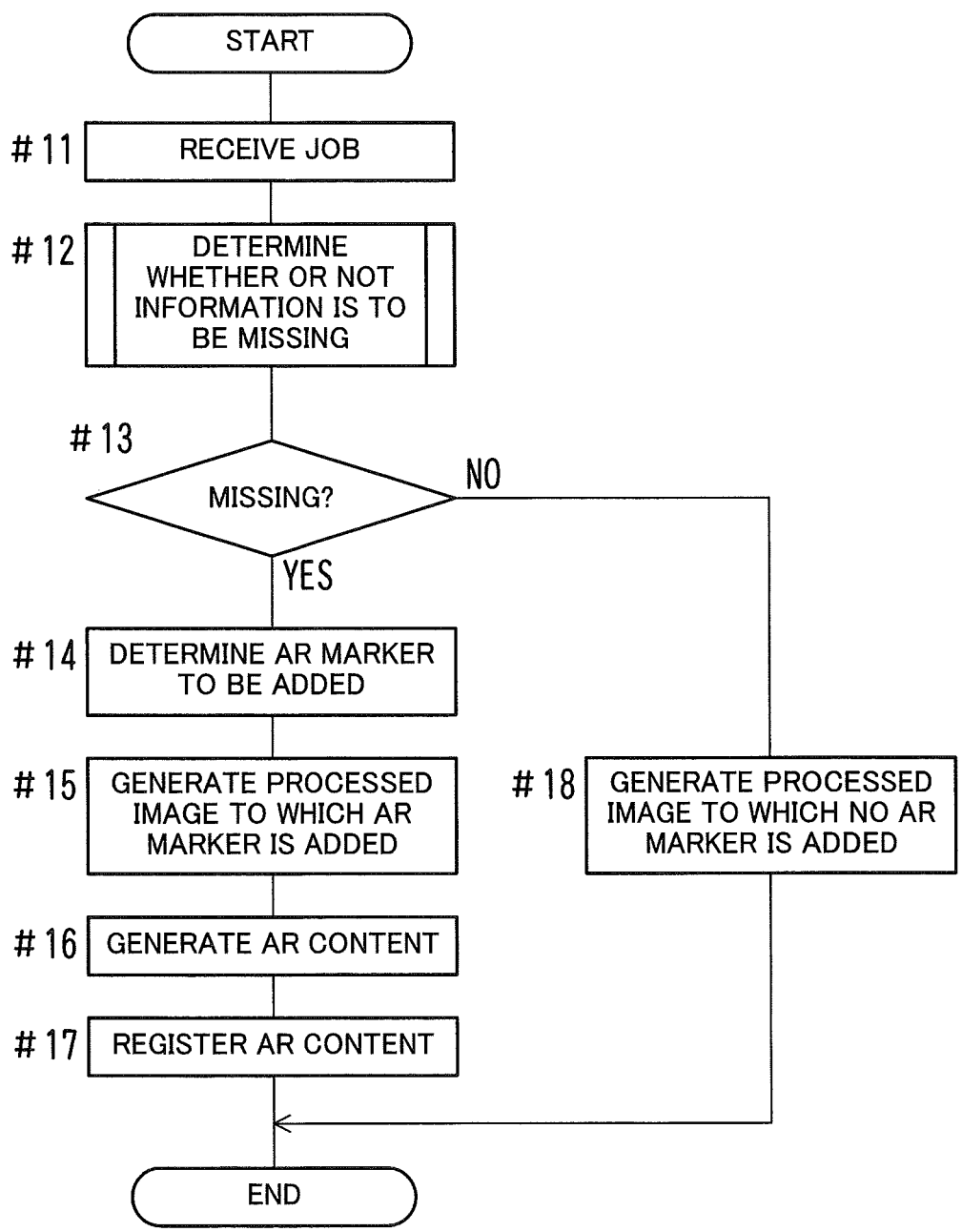
FIG. 25 is a flowchart depicting an example of the flow of the entire processing performed by an image processing apparatus.
Figure 26:
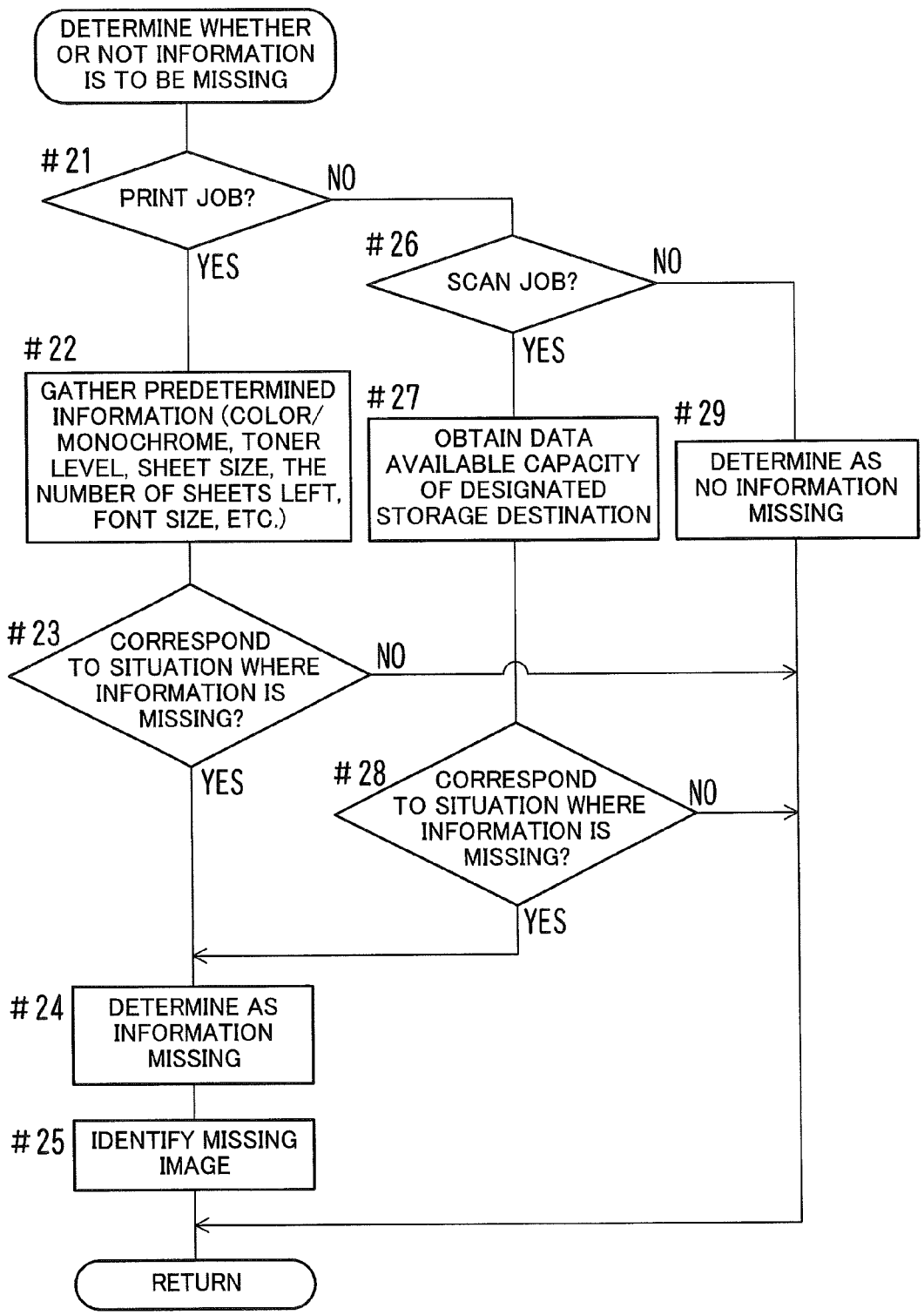
FIG. 26 is a flowchart depicting an example of the flow of processing for determining whether or not information is missing.

FIG. 25 is a flowchart depicting an example of the flow of the entire processing performed by the image processing apparatus 1. FIG. 26 is a flowchart depicting an example of the flow of processing for determining whether or not information is missing.

The image processing apparatus 1 receives an entry of a print job, a scan job, or another job (Step #11 of FIG. 25).

When the image processing apparatus 1 receives a print job or a scan job, the omission determination portion 121 determines whether or not information of the input image 41 is to be missing (Step #12). The details are provided below.

Referring to FIG. 26, if the received job is a print job (YES in Step #21), then the image processing apparatus 1 gathers predetermined information such as a color mode for printing (color/monochrome), a toner level, a sheet size, the number of sheets left, and a font size of input image (Step #22). The image processing apparatus 1 determines, based on the gathered information and the job information, to which of cases (a) through (e) the job execution corresponds (Step #23).

If the received job is a scan job (YES in Step #26), then the image processing apparatus 1 obtains information on available capacity of a storage destination designated by the job (Step #27), and determines whether or not the job execution corresponds to case (f) as discussed above (Step #28).

If the result in Step #23 or Step #28 is YES, then the determination result is "information missing" (Step #24). Then, the missing image 410 of the input image 41 is identified (Step #25).

If the received job is neither a print job nor a scan job (NO in Step #26), then the determination result is "no information missing" (Step #29).

Referring back to FIG. 25, if the result of determination by the omission determination portion 121 is "information missing" (YES in Step #13), then the AR content generating portion 102 determines an AR marker 61 to be added to the processed image 51 for the job (Step #14). A new AR marker 61 may be generated, or, one of AR makers prepared in advance may be selected as the AR marker 61.

After the AR marker 61 is determined, the image processing apparatus 1 generates a processed image 51 in accordance with the job, i.e., a print image or a scanned image. At this time, the image processing portion 101 adds the AR marker 61 to the processed image 51 (Step #15).

After the generation of the processed image 51, or, in parallel with the same, the AR content generating portion 102 generates the AR content 71 (Step #16), and the AR content registration portion 103 transfers the generated AR content 71 to the AR server 2 to store the AR content 71 into the storage portion 104 (Step #17).

If the result of determination by the omission determination portion 121 is "no information missing" (No in Step #13), then a processed image in accordance with the job is generated. In such a case, the image processing portion 101 does not add the AR marker 61 to the processed image.

In the foregoing embodiment, when a print job of using a plurality of sheets, such as a job of printing a document having a plurality of pages, is given, and when the number of sheets left is smaller than the number of sheets necessary for the job, an input image to be reproduced by using the AR technology may be selected by the user. Further, instead of reproducing an input image not to be printed by using the AR technology, a message indicating the presence of an input image not printed may be displayed as the AR content for the user looking at the processed image printed.

As discussed above, in the foregoing embodiment, it is possible to improve, as compared to conventional techniques, the reproducibility of information missing when a processed image corresponding to an input image is generated.

In the foregoing embodiment, the image processing apparatus 1 generates the AR content 71. The present invention is not limited thereto. For example, when the personal computer requests the image processing apparatus 1 through the printer driver to conduct printing, the functions of the omission determination portion 121, the AR content generating portion 102, and the AR content registration portion 103 may be realized by the printer driver. Further, the function to add the AR marker by the image processing portion 101 may be realized by the printer driver. In particular, as for a network print job, it is possible to enter image data to which the AR marker is added by the printer driver into the image processing apparatus 1. In such a case, an image to which the AR marker has not yet been added may be regarded as the input image 41.

When a scan job is given of reading a document image at a resolution of 600 dpi and saving the scanned image data to, for example, a predetermined region (box) in the large-capacity storage 10*d* of the image processing apparatus 1, resolution conversion of reducing the resolution of the scanned image data to 200 dpi is sometimes performed due to a shortage of an available storage of the box. In such a case, a part of the scanned image data at 200 dpi may be replaced with image data on the AR marker 61, and the scanned image data at 600 dpi may be registered as the AR content 71. This enables the user to make the scanned image data at 200 dpi visible by printing or displaying the same. When the scanned image data is photographed by using the terminal 3, it seems to the user as if the scanned image data at 600 dpi were present.

The same is similarly applied also to the case where the storage destination designated in a scan job is a device other than the image processing apparatus 1, for example, is a personal computer.

The image processing apparatus 1 or another device may be provided with the functions of the AR server 2.

Reading an image in monochrome may be performed by using a monochrome image sensor to read an input image. Alternatively, reading an image in monochrome may be performed by using a color image sensor to read an input image and converting the color image data into monochrome image data.

The image processing apparatus 1 is not limited to a multi-functional device. The image processing apparatus 1 may be a device capable of executing only a print job or only a scan job. The image processing apparatus 1 may be a copier, a printer, or a facsimile machine.

It is to be understood that the configuration of the image processing system 100, the image processing apparatus 1, the AR server 2, the terminal 3, the flow of processing, the order and time of the plurality of processing, the size and pattern of the AR marker 61, the data configuration of the AR content 71, the method for storage, and the like can be appropriately modified without departing from the spirit of the present invention.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. An image processing system for generating a processed image depending based on an input image, the system comprising:
    an image processing portion configured to generate a processed image, wherein, in generating the processed image, the image processing portion is configured to add an augmented reality (AR) marker to the input image, the AR marker being associated with missing information that is present in the input image and missing in the processed image and the image processing portion being configured to output the processed image including the AR marker to a tangible recording medium;
    an AR content generating portion configured to generate an AR content corresponding to the missing information;
    an AR content registration portion configured to store, into a storage portion, the AR marker and the AR content in association with each other;
    a terminal operably connected to the storage portion of the AR content registration portion, the terminal comprising:
        a camera configured to photograph the tangible recording medium to generate a photographed image;
        an AR marker recognizing portion configured to recognize the AR marker contained in the photographed image obtained; and
        an AR display processing portion configured to display the AR content stored in association with the recognized AR marker in the storage portion in a manner to be superimposed on the processed image photographed by the camera;
    wherein the AR content comprises image data on a missing image and position data indicating a positional relationship between the AR marker and the missing image.

2. The image processing system according to claim 1, wherein the AR content includes
    size data indicating a size relationship between the AR marker and the missing image.

3. The image processing system according to claim 2, wherein, based on the position data and the size data, the AR display processing portion sets a position and a size of the missing image depending on a position and a size of the AR marker in the photographed image and displays the missing image in such a manner that the input image is reproduced.

4. The image processing system according to claim 2, comprising an operation processing portion configured to receive, when the input image has a plurality of the missing images, an entry, by a user, of designation of a missing image to be displayed from among the plurality of missing images; wherein
    the AR display processing portion displays only the missing image designated among the plurality of missing images.

5. The image processing system according to claim 1, wherein,
    in a state where the storage portion stores therein the AR marker and the AR content, when a cause leading to missing of information of the input image is resolved, the AR content registration portion stores, into the storage portion, system state information indicating the fact in association with the AR marker, and
    when the storage portion stores the system state information therein, the AR display processing portion displays the system state information together with the AR content.

6. The image processing system according to claim 1, wherein,
    the processed image is a print image printed onto a sheet, and
    the AR marker is added to the processed image, and the AR content is generated to be stored into the storage portion when any one of the following cases (a) through (e) is true:
        case (a): at least a part of the input image is a color image, and the processed image is a monochrome image,
        case (b): due to a shortage of a color material, the processed image corresponding to an entirety of the input image cannot be printed,
        case (c): due to a shortage of a sheet, a plurality of the processed images to be printed for the input image cannot be printed,
        case (d): the input image is reduced at a scale ratio based on which a font size is reduced to a predetermined size or smaller, and printing is carried out, and
        case (e): since a size of the sheet is smaller than a size of the input image, a part of the processed image cannot be printed.

7. The image processing system according to claim 1, wherein,
    the processed image is a scanned image obtained by reading the input image recorded on a sheet, and
    the AR marker is added to the processed image, and the AR content is generated to be stored into the storage portion when it is necessary to reduce a resolution to read the input image due to a shortage of a storage capacity of a storage destination of the processed image.

8. An image processing apparatus for generating a processed image based on an input image, the apparatus comprising:
    an image processing portion configured to generate a processed image, wherein in generating the processed image, the image processing portion is configured to add an augmented reality (AR) marker to the input image, the AR marker being associated with missing information that is present in the input image and missing in the processed image and the image processing portion being configured to output the processed image including the AR marker to a tangible recording medium;

an AR content generating portion configured to generate an AR content corresponding to the missing information; and an AR content registration portion configured to store, into a storage portion, the AR marker and the AR content in association with each other;

wherein the AR content comprises image data on a missing image and position data indicating a positional relationship between the AR marker and the missing image.

9. The image processing apparatus according to claim 8, comprising an operation processing portion configured to receive, when the input image has a plurality of missing images each of which shows a part of the missing information, an entry, by a user, of designation of a missing image to be displayed from among the plurality of missing images; wherein the AR content generating portion generates the AR content in such a manner that, among the plurality of missing images, the missing image other than the designated missing image is excluded from display targets.

10. The image processing apparatus according to claim 8, wherein the AR content includes image data on a missing image, the missing image showing a part of the missing information in the input image, position data indicating a positional relationship between the AR marker and the missing image, and size data indicating a size relationship between the AR marker and the missing image.

11. The image processing apparatus according to claim 8, wherein, in a state where the storage portion stores therein the AR marker and the AR content, when a cause leading to missing of information of the input image is resolved, the AR content registration portion stores, into the storage portion, system state information indicating the fact in association with the AR marker.

12. The image processing apparatus according to claim 8, wherein, the processed image is a scanned image obtained by reading the input image recorded on a sheet, and the AR marker is added to the processed image, and the AR content is generated to be stored into the storage portion when it is necessary to reduce a resolution to read the input image due to a shortage of a storage capacity of a storage destination of the processed image.

13. An image forming apparatus for printing a processed image based on an input image, the apparatus comprising:

an image processing portion configured to generate a processed image, wherein in generating the processed image, the image processing portion is configured to add an augmented reality (AR) marker to the input image, the AR marker being associated with missing information that is present in the input image and missing in the processed image and the image processing portion being configured to output the processed image including the AR marker to a tangible recording medium;

an AR content generating portion configured to generate an AR content corresponding to the missing information; and an AR content registration portion configured to store, into a storage portion, the AR marker and the AR content in association with each other;

wherein the AR content comprises image data on a missing image and position data indicating a positional relationship between the AR marker and the missing image.

14. The image forming apparatus according to claim 13, wherein, the processed image is a print image printed onto a sheet, and the AR marker is added to the processed image, and the AR content is generated to be stored into the storage portion when any one of the following cases (a) through (e) is true:

case (a): at least a part of the input image is a color image, and the processed image is a monochrome image, case (b): due to a shortage of a color material, the processed image corresponding to an entirety of the input image cannot be printed, case (c): due to a shortage of a sheet, a plurality of the processed images to be printed for the input image cannot be printed, case (d): the input image is reduced at a scale ratio based on which a font size is reduced to a predetermined size or smaller, and printing is carried out, and case (e): since a size of the sheet is smaller than a size of the input image, a part of the processed image cannot be printed.

15. An image processing method for generating a processed image based on an input image, the method comprising:

generating a processed image with an image processing portion; wherein, in generating the processed image, the image processing portion is configured to add an augmented reality (AR) marker to the input image, the AR marker being associated with missing information that is present in the input image and missing in the processed image and outputting the processed image including the AR marker to a tangible recording medium;

generating, with an AR content generating portion, an AR content corresponding to the missing information;

storing, into a storage portion, the AR marker and the AR content in association with each other;

photographing, with a camera, the tangible recording medium to generate a photographed image;

recognizing, with an AR marker recognizing portion, the AR marker contained in a photographed image obtained by photographing the processed image; and displaying, with an AR display processing portion, the AR content stored in association with the recognized AR marker in the storage portion in a manner to be superimposed on the processed image which is printed or displayed;

wherein the AR content comprises image data on a missing image and position data indicating a positional relationship between the AR marker and the missing image.

16. A non-transitory computer-readable medium storing therein computer-executable instructions that, when executed by a computer, cause the computer to perform:

generating a processed image using an image processing portion, wherein in generating the processed image, the image processing portion is configured to add an augmented reality (AR) marker to the input image, the AR marker being associated with missing information that is present in the input image and missing in the processed image, and outputting the processed image including the AR marker to a tangible recording medium;
generating an AR content corresponding to the missing information; and
storing, into a storage portion, the AR marker and the AR content in association with each other;
wherein the AR content comprises image data on a missing image and position data indicating a positional relationship between the AR marker and the missing image.

* * * * *